US008374826B2

(12) United States Patent
Schmidt et al.

(10) Patent No.: US 8,374,826 B2
(45) Date of Patent: Feb. 12, 2013

(54) SYSTEM, APPARATUS AND METHOD FOR CALIBRATING A DELAY ALONG A SIGNAL PATH

(75) Inventors: Georg Schmidt, Laichingen (DE); Markus Hilsenbeck, Beimerstetten (DE); Maik Riegler, Blaustein (DE)

(73) Assignee: Ubidyne, Inc., Wilmington, DE (US)

( * ) Notice: Subject to any disclaimer, the term of this patent is extended or adjusted under 35 U.S.C. 154(b) by 367 days.

(21) Appl. No.: 12/709,572

(22) Filed: Feb. 22, 2010

(65) Prior Publication Data

US 2011/0204934 A1 Aug. 25, 2011

(51) Int. Cl.
*G01D 18/00* (2006.01)
*G01D 21/00* (2006.01)

(52) U.S. Cl. ............................ 702/189; 702/85; 702/89

(58) Field of Classification Search .................... 702/85, 702/189, 190; 342/168, 173, 174, 368, 372, 342/375, 377, 455; 327/100, 140, 155
See application file for complete search history.

(56) References Cited

U.S. PATENT DOCUMENTS

| | | | | |
|---|---|---|---|---|
| 6,141,332 | A * | 10/2000 | Lavean | 370/335 |
| 6,693,588 | B1 * | 2/2004 | Schlee | 342/368 |

FOREIGN PATENT DOCUMENTS

| | | |
|---|---|---|
| GB | 2447981 | 10/2008 |
| KR | 1020050089853 | 9/2005 |
| WO | 2007/049023 | 5/2007 |

OTHER PUBLICATIONS

Passmann et al, "Investigation of a Calibration Concept for Optimum Performance of Adaptive Antenna Systems" Vehicular Technology Conference, 1998, pp. 577-580.

* cited by examiner

*Primary Examiner* — Sujoy Kundu
(74) *Attorney, Agent, or Firm* — Stephen H. Eland; Dann, Dorfman, Herrell & Skillman

(57) ABSTRACT

The present disclosure teaches a calibration system, a calibration apparatus and a method for calibrating a signal path and a method for calibrating a delay. The calibration system comprises an injector, a calibration signal generator, a correlator, a detector unit, a polygon former and a pattern classifier unit. The calibration system is adapted to calculate a fraction of a delay from a set of polygons. The delay is being accumulated along a signal path. The fraction of the delay is indicative of an accuracy of the delay at a fine sampling rate as if the delay was measured at the fine sampling rate being an integer multiple of the coarse sampling rate. The method for calibrating of the signal path uses a calibration signal sampled at a coarse sampling rate. Correlation techniques are used in order to detect a fraction of the delay from a set of polygons.

35 Claims, 17 Drawing Sheets

SYSTEM, APPARATUS AND METHOD FOR CALIBRATING A DELAY ALONG A SIGNAL PATH

FIELD OF THE INVENTION

The field of the invention relates to a calibration system and a method for calculating a fraction of a delay along a signal path.

BACKGROUND OF THE INVENTION

The use of mobile communications networks has increased over the last decade. Operators of mobile communication networks have increased the number of base stations in order to meet an increased request for service by users of mobile communications networks. It is of interest for the operator of the mobile communications network to reduce the running costs of the base stations. It is one option to implement the radio system as an antenna embedded radio system. In the antenna embedded radio system, some of the hardware components of the radio system may be implemented on a chip. The antenna embedded radio system therefore reduces running costs of the base station. Implementing the radio system as the antenna embedded radio system reduces space needed to house the hardware components of the base station. Power consumption during normal operation of the radio system is reduced when implanting the antenna invaded radio system comprising the chip.

It is of interest to provide a reliable quality of service to individual users of the mobile communication network given the increase in the number of users. Several techniques have been suggested in order to deal with the increased number of users within the mobile communications network. One of these several techniques is the provision of beam forming capabilities in order to direct a beam relayed by the radio system in different directions to improve service coverage of the mobile communications network. The beam forming techniques rely on defined phase and amplitude relations between several ones of antenna elements of the active antenna system. Delays along a transmit path and/or a receive path (commonly termed "signal path") may cause a delay for signals travelling along the signal path. Likewise phase and amplitude of the signal travelling along the signal path may change when the signal travels along the signal path. For some applications it is of interest to calibrate a transmit time or the delay accumulated along the signal path. The calibration of the delay is of interest, should the delay vary with conditions of the signal path, such as but not limited to start-up conditions of the signal path. A change in the delay depending on the start-up conditions is, for example, relevant for the signal paths relaying digital signals. Buffers in the digital signal path may introduce the variable delay depending on the start-up conditions. Frequently the signal path may be operating at a higher frequency and a higher sampling rate than the signal entering the signal path.

The prior art discloses the examples of the measurement of the delay introduced by the signal path at a coarse sampling rate corresponding to the lower frequency of the signal entering the signal path.

Several concepts for calibrating an active antenna system comprising several signal paths relaying signals in a well-defined fashion are known. For example, "Investigation of a calibration concept of optimum performance of adapted antenna systems" by Passmann et al. of Robert Bosch GmbH at Vehicular Technology Conference, 1998, VTC98, p. 577-580, discloses a calibration concept for an adaptive antenna system. The calibration concept consists of (i) offline calibration of passive components after the manufacture; and (ii) an on-line calibration of active components during operation.

Korean Patent Application Number 1020050089853A (assigned to DA TANG Mobile Communications) teaches a method for calibrating smart antenna array systems in real time. The DA TANG application teaches a iterative method of calibrating smart antenna array systems using compensation factors of previous calibrations in order to calibrate transmit and receive paths.

U.S. Pat. No. 6,693,588 B1 (assigned to Siemens) discloses an electronically phase controlled group antenna. The electronically phase controlled group antenna is calibrated using a reference point shared by all the reference signals. In the downlink reference signals which can be distinguished from one another are simultaneously transmitted by individual antenna elements of the group antenna and suitably separated after reception at the shared reference. The Siemens system requires a fixed special arrangement of the antenna elements.

International Patent Application Number WO 2007/049023 A1 (assigned to Mitsubishi Ltd.) teaches a signal processing and time delay measurement based on combined correlation and differential correlation. Two versions of a binary signal having an irregular sequence of states are processed by dividing (i) the first value which represents the average time derivative of one signal at the times of transitions in the other signal, and (ii) a correlation value for the two signals, and then combining the first value with the correlation value. For a given relative delay introduced between the signals, the resultant combined value indicates whether the introduced delay brings the transitions in the two signals into coincidence. This process can be repeated for other introduced delays to determine the amount of delay between the two signals.

UK Patent Application Number GB 2 447 981 A (assigned to Mitsubishi electric information technology Centre Europe B. V.) discloses a time delay measurement for global navigations satellite system receivers. A method is provided for processing first and second signals having a delay there between, whereby at least the first signal is an irregular binary signal having chip boundaries. The method comprises introducing a plurality of different delays between the first and second signals, the successive delay amounts differing from each other by less than the interval between chip boundaries. For each introduced delay, summing the samples of the second signal which are obtained at the times when the chip boundaries between bits of the first signal have the same state (i.e. a transition from 1 to 0, from 1 to 0, from 0 to 0, or from 1 to 1) in order to obtain a value, and thereby obtaining a representation of how the value varies according to the introduced delay, such that the representation contains a level change associated with an introduced delay which bears a predetermined relationship to the delay between the first and the second signal. Values corresponding to different transitions may be subtracted from one another. The method is particularly suited for processing signals in GPS or other similar positioning signals, for example, in a tracking loop phase error discriminator for DLL code alignment, or in line of sight signal (LoS) signal timing recovery from multi path contamination.

SUMMARY OF THE INVENTION

The present disclosure teaches a calibration system. The calibration system comprises an injector, a calibration signal generator, a correlator, a detector unit, a polygon generator and a pattern classifier unit. The injector injects a pilot signal upstream of a signal path. The calibration signal generator provides a calibration signal sampled at a coarse sampling rate. The correlator calculates a correlation of the calibration signal with an input signal. The detector unit detects a peak region in the correlation. The polygon generator forms a set of polygons from the peak region. The pattern classifier unit calculates a fraction of a delay from the set of polygons. The delay is accumulated along the signal path. The fraction of the delay is indicative of an accuracy of the delay at a fine sampling rate. The fine sampling rate is an integer multiple of the coarse sampling rate.

The term "coarse sampling rate" and "a fine sampling rate being an integer multiple of the coarse sampling rate" as used within this disclosure are defined as follows. An analogue signal is sampled to represent the analogue signal in a digital domain. A "sampling rate" defines how often the analogue signal is sampled during a given time period. For time varying signals the sampling rate needs to be sufficiently high to capture all of the variations of the time varying signal. A minimal sampling rate is given by the Nyquist criterion. The sampling rate defines a sequence of equally spaced points in time. The interval between the equally spaced points is termed "sampling time".

A time resolution at the sampling rate is given by the sampling time. Time intervals smaller than the sampling time associated with the sampling rate may not be determined when sampling at the sampling rate.

The fine sampling rate in this disclosure is an integer multiple of the coarse sampling rate. The sampling time of the coarse sampling rate is divided into an integer number of sub-sampling times or fractions. The sub-sampling time or individual fractions correspond to the fine sampling time at the fine sampling rate.

The delay was measurable at a time resolution of the coarse sampling time in the prior art as the calibration signal could only be sampled at this time resolution. The present disclosure teaches a measurement of the delay to the fraction of the delay, i.e. as if the calibration signal was sampled at the fine sampling rate. Using the calibration system of the present disclosure it is not necessary to oversample the calibration signal.

The present disclosure further teaches a method for calibrating the signal path. The method comprises a generating of a calibration signal sampled at a coarse sampling rate. The method further comprises an injecting of a pilot signal and generating a correlation of the calibration signal and an input signal. A peak region is detected in the correlation and the method comprises a step of forming a set of polygons from the peak region. A fraction of a delay is calculated from the set of polygons. The fraction of the delay provides an accuracy of the delay at a fine sampling rate. The fine sampling rate is an integer multiple of the coarse sampling rate.

The present disclosure further teaches a calibration apparatus. The calibration apparatus comprises an injector, a calibration signal generator, a correlator and a correlation pattern detector. The injector injects a pilot signal upstream of at least one signal path. The calibration signal generator provides a calibration signal. The correlator provides a correlation of the calibration signal with an input signal sampled at a coarse sampling rate. A correlation pattern detector generates an interpolated correlation for detecting a fraction of the delay. The fraction is indicative of an accuracy of the delay at a fine sampling rate. The fine sampling rate is an integer multiple of the coarse sampling rate.

The present disclosure further teaches a method for delay calibration. The method comprises generating a calibration signal sampled at a coarse sampling rate and injecting a pilot signal. A correlation of an input signal with the calibration signal is generated. The method comprises a step of oversampling and a step of identifying a peak in a correlation pattern. A fraction of a delay is deducible from the correlation pattern. The fraction of the delay is indicative of an accuracy of the delay at a fine sampling rate. The fine sampling rate is an integer multiple of the coarse sampling rate.

The present disclosure further teaches a computer program product comprising instructions for a manufacture of the calibration system.

The present disclosure further teaches a computer program product comprising instructions enabling a processor for the method for delay calibration.

The present disclosure further teaches a computer program product comprising instructions enabling a processor for manufacture of the calibration apparatus.

The present disclosure further teaches a computer program product comprising instructions enabling a processor to execute the method for delay calibration.

DETAILED DESCRIPTION OF THE INVENTION

The invention will now be described on the basis of the drawings. It will be understood that the embodiments and aspects described herein are only examples and do not limit the protective scope of the claims in any way. The invention is defined by the claims and their equivalents. It will also be understood that features of one aspect can be combined with features of a different aspect.

Figure 1:
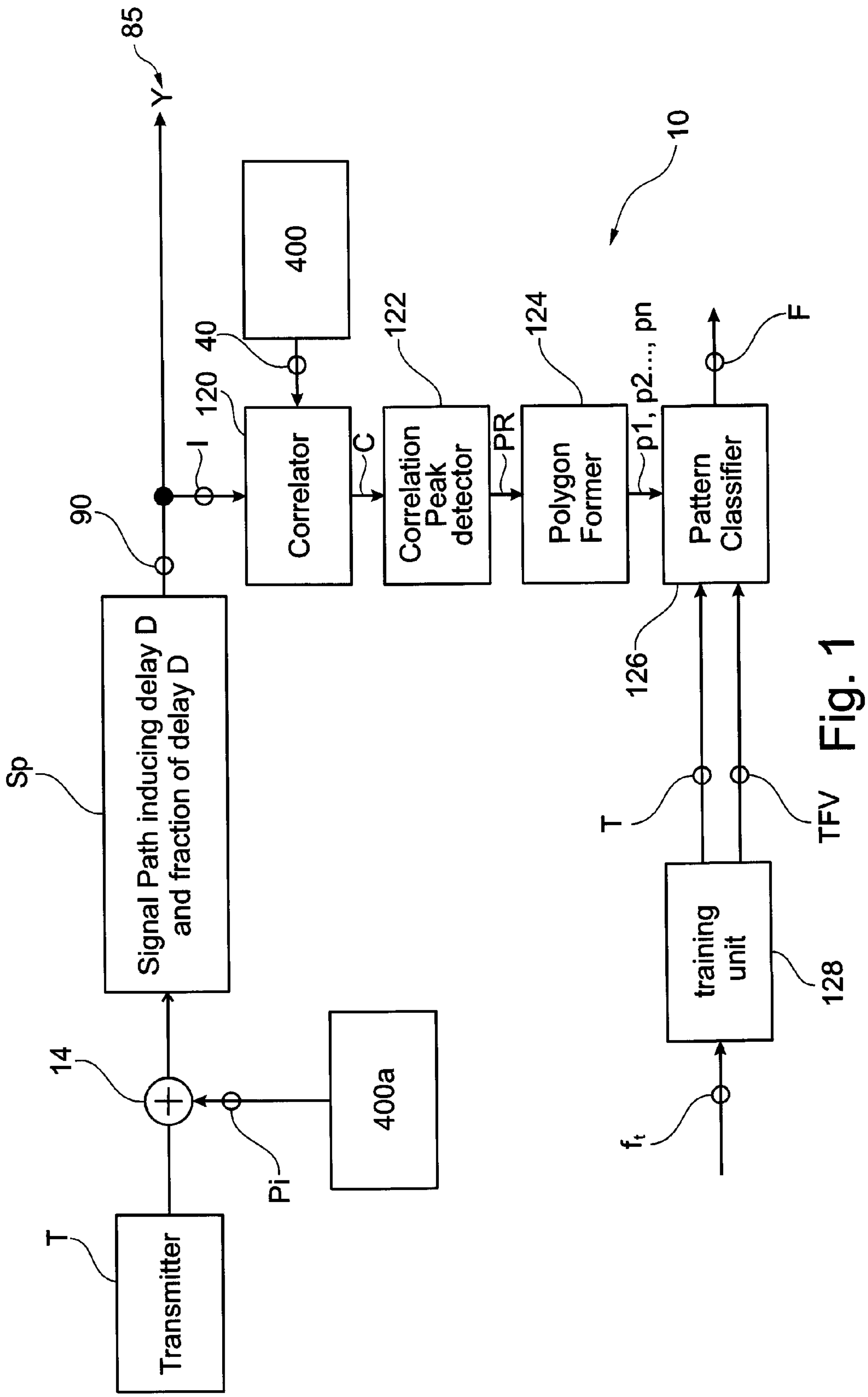
FIG. 1 shows a calibration system.

FIG. 1 shows a calibration system 10 of the present disclosure. In systems relaying signals a signal path Sp may introduce a delay D when the signals are travelling along the signal path Sp. The signals travelling along the signal path Sp may be radio signals. If a pilot signal Pi enters the signal path Sp the delay D will be imposed onto the pilot signal Pi. The delay D imposed on the signal leaving the signal path Sp may be variable, for example depending on start up conditions of the signal path Sp. The delay D may, in particular, be affected by the start up conditions of a digital signal path Sp. The variable delay D may, for example, stem from buffer units within the digital signal path Sp. It is a known feature of digital buffers running at a higher sampling rate than the coarse sampling rate to generate a sub-sample delay depending on the start-up conditions of the buffer and hence the digital signal path Sp. Furthermore there may be analogue sources for the variable delay such as variations in group delays of analogue filters due to a temperature drift. The signal 10 entering the signal path Sp is typically at a lower frequency than the signal leaving the signal path Sp, for example, the transmit signal 90. The signal entering the signal path Sp may be of a higher frequency than the signal leaving the signal path Sp.

FIG. 1 shows a transmit side of the signal path Sp relaying the radio signals from a transmitter T (on the left side) to an antenna 85 on the right side. The signals reaching the antenna 85 are typically sampled at a coarse sampling rate. Hence a first estimate of the delay D introduced by the signal path Sp is typically given at a coarse sampling rate Rs. The coarse sampling rate Rs may be the coarse sampling rate of a base band, as is known in the art. The coarse sampling rate may alternatively be a coarse sampling rate of an intermediate frequency band. The intermediate frequency band is any frequency band between a base band frequency band and a transmit band of the signal path Sp.

The present disclosure enables the calibration system 10 to correct for a fraction F of the delay D accumulated along the signal path Sp. For a coherent transmission of the signal path Sp it is of interest to compensate for the fraction F of the delay D of individual ones of the signal paths Sp. As mentioned previously the delay D is typically sampled at the coarse sampling rate Rs. The delay D and the fraction F of the delay provide an accuracy of the delay D as if the delay D was measured at a fine sampling rate Rf. The fine sampling rate Rf is typically an integer multiple of the coarse sampling rate Rs. In a typical situation the fine sampling rate Rf is eight times faster than the coarse sampling rate Rs. Upstream of the signal path Sp a pilot signal Pi is injected into the signal entering the signal path Sp from the left, for example the payload signal 11, as depicted in FIG. 1. The injecting of the pilot signal Pi may be carried out using an injector 14. There may be a pilot signal Pi generator 400*a*. The pilot signal generator 400*a* may be synchronised with a calibration signal generator 400.

From the signal leaving the signal path Sp, for example the transmit signal 90, an input signal I is extracted for a correlator 120. The input signal I may for example be extracted using a directional coupler or the like. The input signal I comprises a portion of a transmit signal 90 being forwarded to an antenna element 85. The calibration signal generator 400 generates a calibration signal 40. The calibration signal 40 is provided in the base band. Therefore the calibration signal 40 is sampled on the coarse sampling rate Rs. the calibration signal 40 may also be provided in the transmit frequency band, i.e. sampled at the fine sampling rate Rf.

The correlator 120 correlates the input signal I and the calibration signal 40. The correlator 120 calculates a correlation C. The correlation C provides information as to on a degree of similarity between the input signal I and the calibration signal 40. The correlation C is calculated with respect to the coarse sampling rate Rs. Therefore the correlation C appears sampled at the coarse sampling rate Rs. It is conceivable but expensive to provide the correlation C sampled at the fine sampling rate Rf, as hardware required for sampling at the fine sampling rate is substantially more complex and expensive than a hardware for sampling at the coarse sampling rate Rs. Time taken for generation of the correlation will also increase if the input signal I and/or the calibration signal 40 are sampled at the fine sampling rate Rf. In many situations it is not possible to provide the correlator 120 such that the correlation C appears sampled at the fine sampling rate Rf, as available sampling rates for the correlator 120 may depend on general features of the calibration system 10. In such cases a change in the sampling rate for the correlator 120 would require a substantial redesign of the calibration apparatus 10 causing a substantial increase in hardware costs.

Figure 3A:
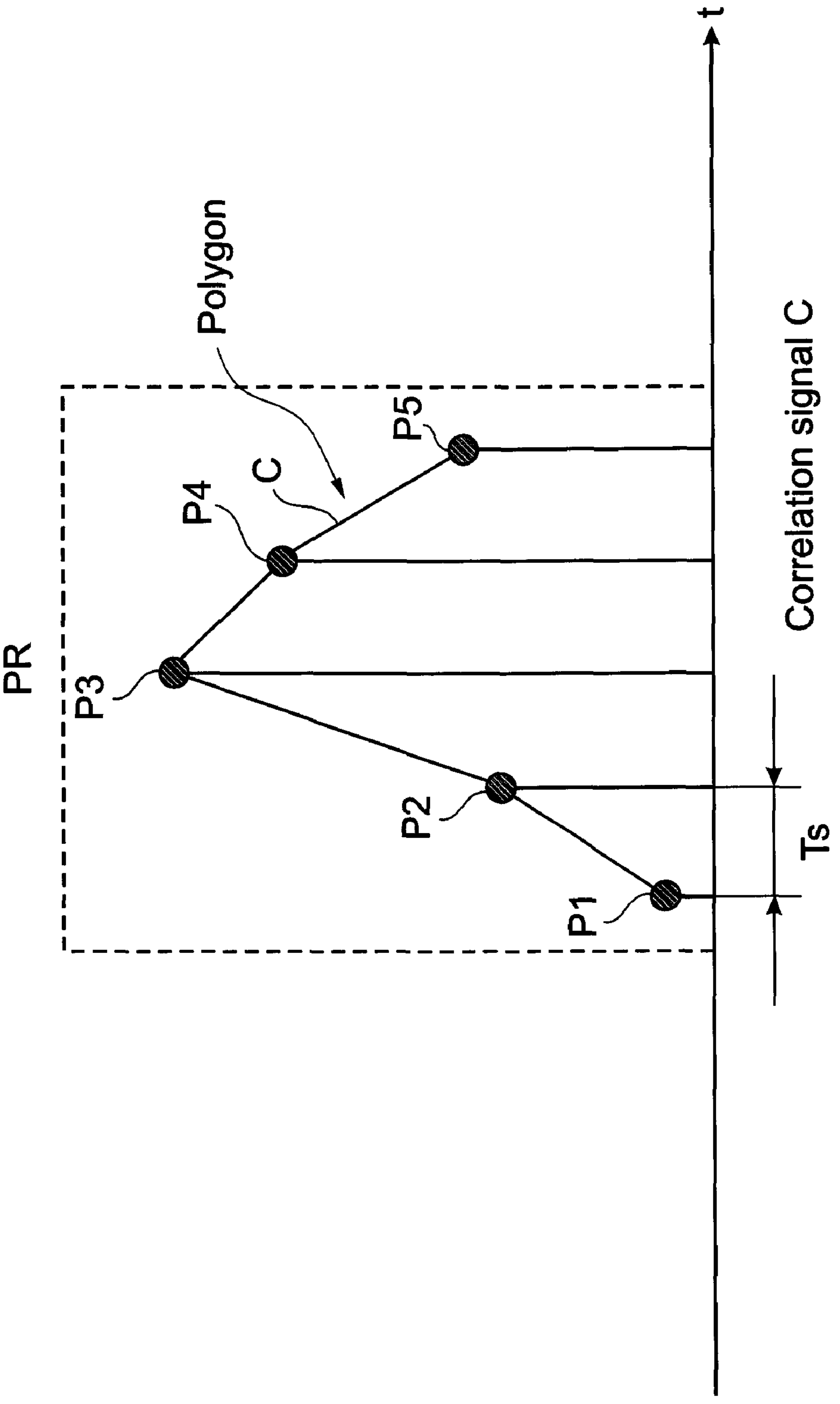
FIG. 3*a* shows a peak region in a correlation.

A detector unit 122 is adapted to identify a peak region PR in the correlation C (see FIG. 3*a*). It is to be noted that the peak region PR comprises a number of measured points of the correlation C centred around a peak in the correlation C. Individual points of the correlation C in the peak region PR are spaced at a coarse sampling time Ts, as the correlation C appears sampled at the coarse sampling rate Rs. The delay D may be deduced from a position of the peak in the peak region PR as is known in the art. The delay D deduced from the peak may only be derived with accuracy according to the coarse sampling rate Rs, as the correlation C was only provided at the coarse sampling rate Rs. The peak region PR identified by the detector unit 122 is forwarded to a polygon former 124 and a polygon classifier unit 126 as will be explained with respect to FIGS. 3*c* and 3*e* (see below).

The polygon former 124 generates a set of polygons p1, p2, . . . , pn. The polygons p1, p2, . . . , pn are forwarded to a pattern classifier 126. The pattern classifier 126 calculates the fraction F of the delay D at the fine sampling rate Rf. The delay D and the fraction F of the delay D provide an accuracy of the delay D as if the delay D was measured at the fine sampling rate Rf. The fraction F represents a number of sub-sample steps which are to be added or subtracted from the delay D in order to calculate the delay D in terms of the fine sampling rate Rf. The operation of the polygon former 124 and the pattern classifier 126 will be explained with respect to FIG. 3.

FIG. 1 shows a training unit 128 connected to the pattern classifier 126. The training unit 128 generates a transformation matrix T and a set of template feature vectors TFV from a training set of feature vectors $f_t$ that was measured and/or calculated. It is to be noted that the training unit 128 may be used independently from the calibration system 10 in order to provide the transformation matrix T and the set of template feature vectors TFV, as will be explained with respect to FIGS. 3*d* and 3*e*.

Figure 2:
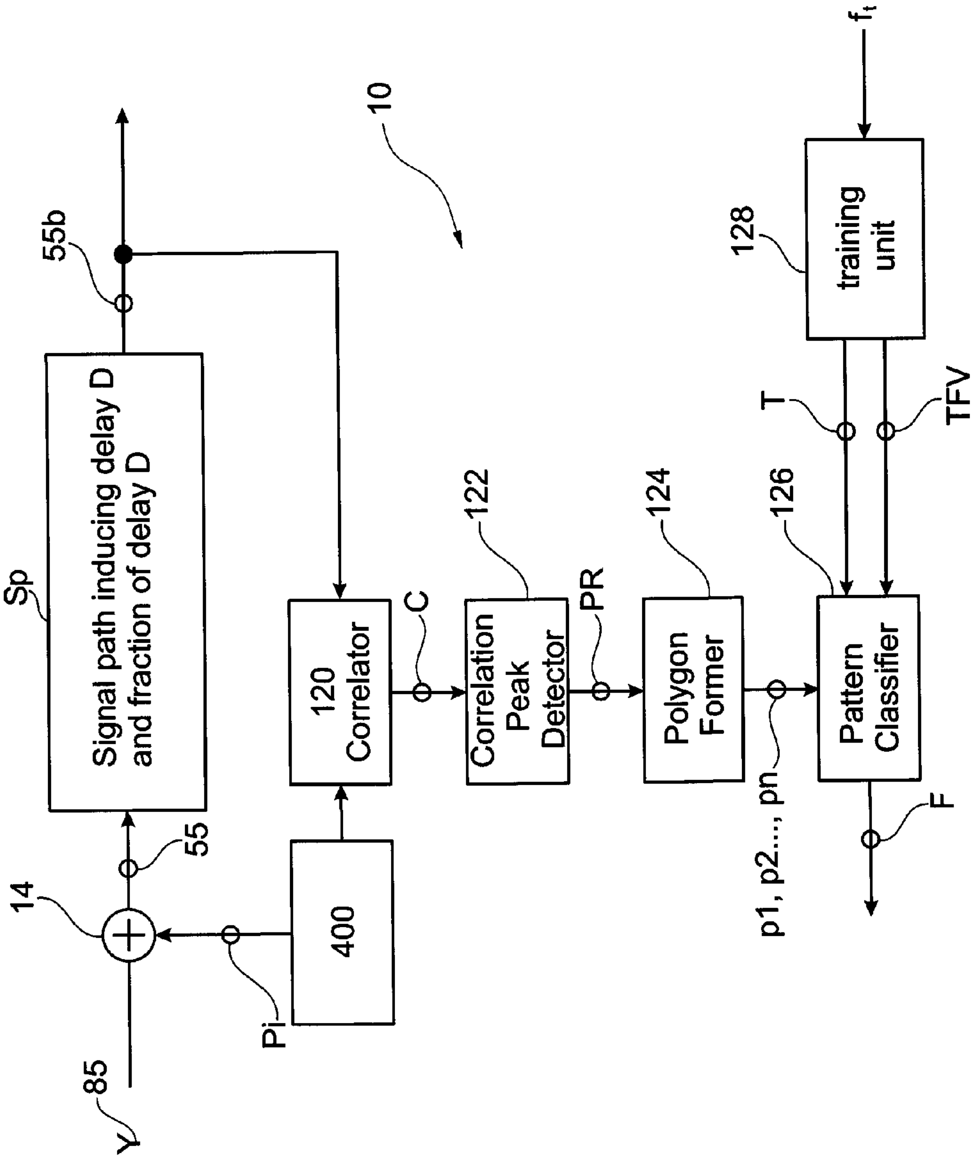
FIG. 2 shows another aspect of the calibration system.

FIG. 2 shows an example of the calibration system 10 used in a receive portion of a system relaying signals, such as a receive portion of an active antenna system 1. A receive signal 55 enters the signal path Sp from the left. A pilot signal Pi is injected into the receive signal 55, as is known in the art. In FIG. 2 there is no individual pilot signal generator 400*a* but the calibration signal generator 400. The receive signal 55 from an antenna element 85 is in the receive band. A signal leaving the signal path Sp at the right side of the signal path Sp may be a receive signal 55*b* in the base band. The receive signal 55*b* may be in the intermediate frequency band, as discussed for the pilot signal Pi in FIG. 1. All of the remaining components of FIG. 2 are identical with those shown in FIG. 1.

FIG. 3*a* shows an example of the peak region PR of the correlation C as generated by the correlator 120. The individual points P1, P2, P3, P4 and P5 of the correlation C may be interpreted as vertices of a polygon. In FIG. 3*a* only the individual points P1, P2, . . . , P5 are shown. Nevertheless more than five points may be included around the peak P3 in the peak region PR in FIG. 3*a*.

The present disclosure teaches the application of well known methods in the field of pattern recognition in order to identify the fraction F at the fine sampling rate Rf from a shape of one or more polygons formed from the individual points P1, P2, . . . , Pn in the peak region PR. The shape of the one or more polygons may be described by a feature vector, which may be transformed to a low-dimensional space using a Karhunen Loève transform in order to reduce complexity and improve performance. The individual points P1, P2, . . . , Pn in the peak region PR are separated by the sampling time Ts.

Figure 3B:
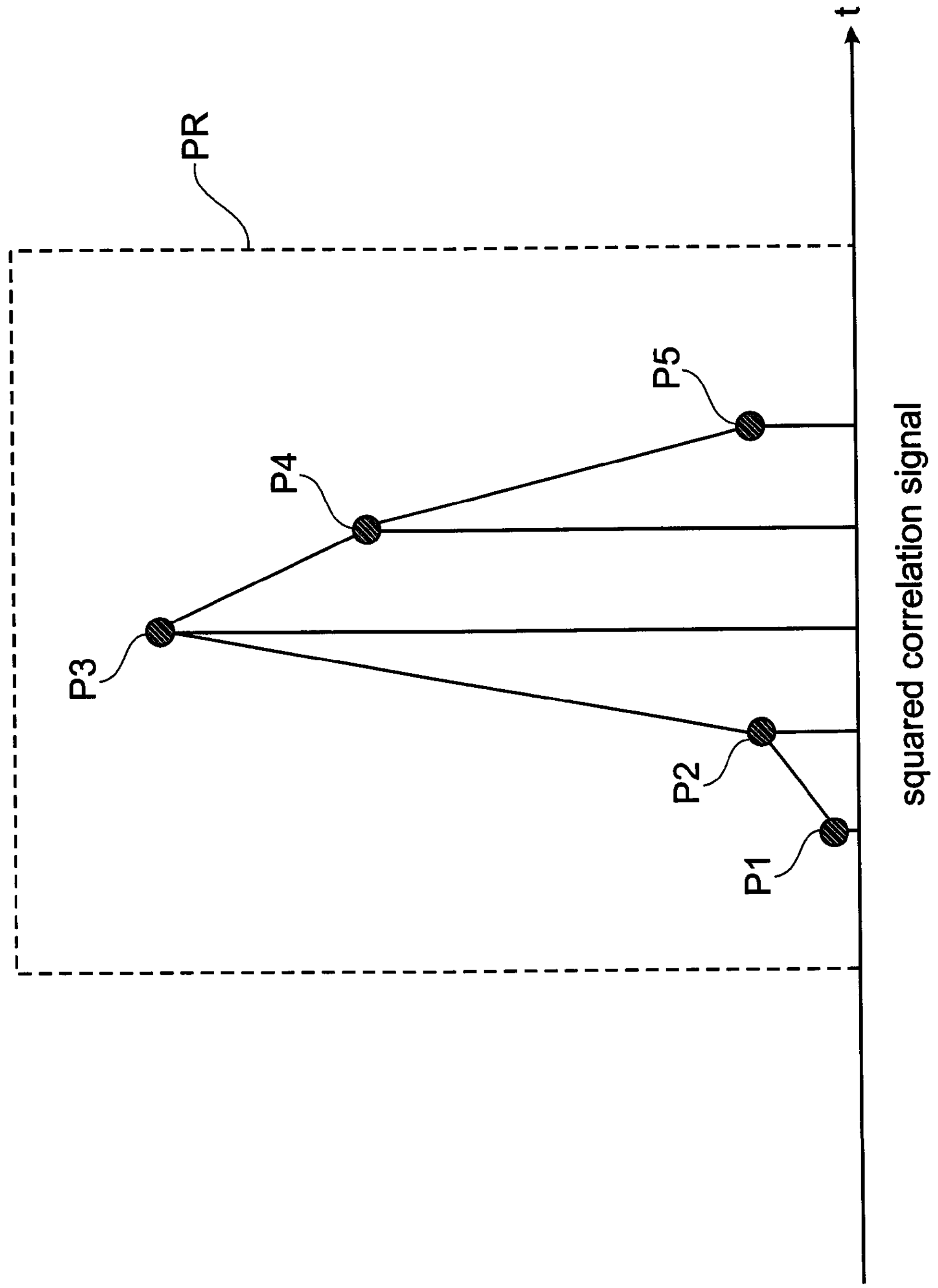
FIG. 3*b* shows scaled sample points, in a peak region

FIG. 3*b* shows the peak region PR with scaled sample points after a non-linear function was applied to the individual points P1, P2, . . . , P5 of FIG. 3*a*. The non-linear function may, for example, be a quadratic function, such as squaring the values of the points P1, P2, . . . , P5 within the peak region PR as indicated in the example of FIG. 3*b*. The non-linear function may be of interest to applying an individual weighting to individual ones of the points P1, P2, . . . , Pn. The individual points P1, P2, . . . , Pn may be used to form polygons p1, p2, . . . , pn from the points P1, P2, . . . Pn in the peak region PR. The points P1, P2, . . . , Pn are defined as pairs of coordinates ($x_i$, $y_i$). The first coordinate xi denotes the x-coordinate of and individual one of the points P1, P2, . . . , Pn separated by the sampling time Ts. The second coordinate yi denotes the y-coordinate and is the value obtained from the correlation and the non-linear function (if applied). The points P1, P2, . . . P5 in FIG. 3*a* are interpreted as vertices of an individual polygon with a characteristic shape. Alternatively it is conceivable to interpret the points P1, P2, . . . , Pn as vertices of a multiplicity of polygons. The weighting of the points P1, P2, . . . , Pn will be achieved by a non-linearity module 132 shown in FIG. 3*e* which applies a non-linear function to the points P1, P2, . . . , Pn.

Figure 3C:
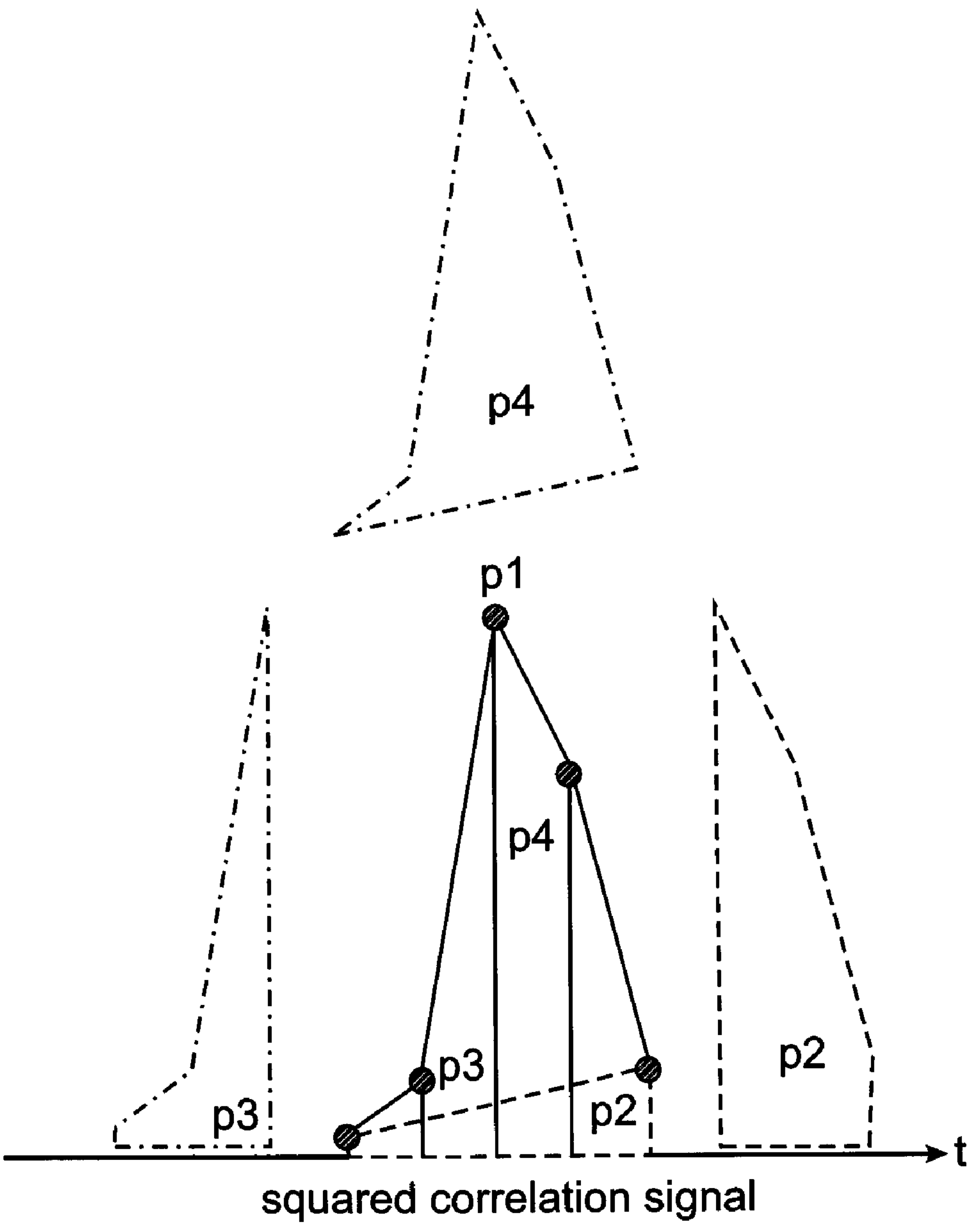
FIG. 3*c* shows a set of polygons formed from the squared sample points in a peak region.

FIG. 3*c* shows an exemplary separation of the peak region PR (see FIG. 3*b*) into individual ones of the polygons: p1 is the original peak region PR, a polygon p2 is shown to the right of the original peak region, a polygon p3 is shown to the left and another polygon p4 shown above the original peak region PR. It is to be understood that the polygons p1, p2, p3 and p4 form a set of polygons p1, p2, . . . , pn. The correlation pattern C is described by features which are extracted from a set of (not necessarily) disjoint polygons p1, p2, . . . pn. The set of polygons p1, p2, . . . , pn provides features of the feature vector f.

We first define the following moments of order zero, one and two of a polygon p. For a reference regarding a concept of moments, see e.g. C. Steger, "*On the Calculations of Arbitrary Moments of Polygons*", Technical Report FGBV-96-05, Technische Universtiat Munich.

$$a(p) = \frac{1}{2}\sum_{i=1}^{v} x_{i-1}y_i - x_iy_{i-1},$$

wherein i is a cyclic index over the points P1, P2, . . . , Pn forming the polygon p, $x_i$ is an x coordinate of the i-th point Pi of the polygon p, $y_i$ is a y coordinate of the i-th point Pi of the polygon p, a is a measure of an area of the polygon p.

Moments of order zero, one and two will be used to extract features from the points P1, P2, . . . , Pn in the peak region PR. Moments of first order may be defined by:

$$\alpha_{1,0}(p) = \frac{1}{6a}\sum_{i=1}^{v}(x_{i-1}y_i - x_iy_{i-1})(x_{i-1} + x_i)$$

$$\alpha_{0,1}(p) = \frac{1}{6a}\sum_{i=1}^{v}(x_{i-1}y_i - x_iy_{i-1})(y_{i-1} + y_i).$$

Moments of second order $\mu_{2,0}(p)$, $\mu_{1,1}(p)$ and $\mu_{0,2}(p)$ may be defined by:

$$\alpha_{2,0}(p) = \frac{1}{12a}\sum_{i=1}^{v}(x_{i-1}y_i - x_iy_{i-1})(x_{i-1}^2 + x_{i-1}x_i + x_i^2)$$

$$\alpha_{1,1}(p) = \frac{1}{24a}\sum_{i=1}^{v}(x_{i-1}y_i - x_iy_{i-1})(2x_{i-1}y_{i-1} + x_{i-1}y_i + x_iy_{i-1} + 2x_iy_i)$$

$$\alpha_{0,2}(p) = \frac{1}{12a}\sum_{i=1}^{v}(x_{i-1}y_i - x_iy_{i-1})(y_{i-1}^2 + y_{i-1}y_i + y_i^2)$$

$$\mu_{2,0}(p) = \alpha_{2,0} - \alpha_{1,0}^2$$

$$\mu_{1,1}(p) = \alpha_{1,1} - \alpha_{1,0}\alpha_{0,1}$$

$$\mu_{0,2}(p) = \alpha_{0,2} - \alpha_{0,1}^2.$$

We formally define a polygon as an ordered sequence $p=[(x_i, y_i)\ \forall i=1 \ldots v]$ of pairs of x coordinates and y coordinates.

Next, we calculate $$a_1 = a(p_1)$$

$$a_2 = a(p_2)$$

$$a_3 = a(p_3)$$

$$a_4 = a(p_4) \text{ and}$$

$$f_1 = \frac{a_2}{a_1}$$

$$f_2 = \frac{a_3}{a_1}$$

$$f_3 = \frac{a_4}{a_1}$$

$$f_4 = \alpha_{1,0}(p_2)$$

$$f_5 = \alpha_{0,1}(p_2)$$

$$f_6 = \mu_{2,0}(p_2)$$

$$f_7 = \mu_{0,2}(p_2)$$

$$f_8 = \mu_{1,1}(p_2)$$

$$f_9 = \alpha_{1,0}(p_3)$$

$$f_{10} = \alpha_{0,1}(p_3)$$

$$f_{11} = \mu_{2,0}(p_3)$$

$$f_{12} = \mu_{0,2}(p_3)$$

$$f_{13} = \mu_{1,1}(p_3)$$

$$f_{14} = \alpha_{1,0}(p_4)$$

$$f_{15} = \alpha_{0,1}(p_4)$$

-continued $$f_{16} = \mu_{2,0}(p_4)$$

$$f_{17} = \mu_{0,2}(p_4)$$

$$f_{18} = \mu_{1,1}(p_4),$$

and form the 18-dimensional feature vector $$f=(f_1,f_2, \ldots , f_{18}).$$

Figure 3D:
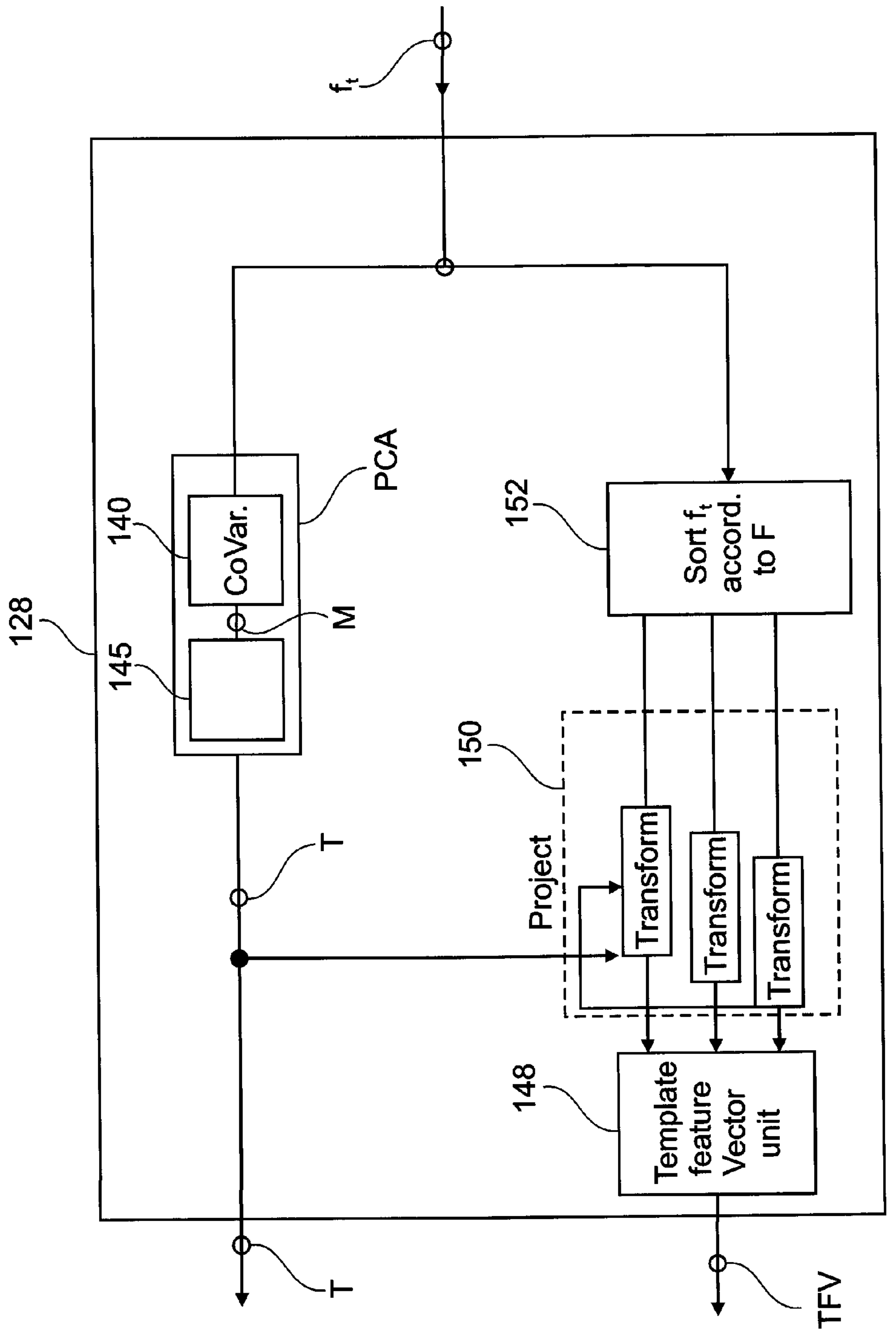
FIG. 3*d* shows an aspect of a training unit.

The moments described above may be calculated using the training unit 128 shown in FIG. 3*d* The feature vector f is a formal description of an individual one of the polygons p1, p2, . . . , pn in the peak region PR formed by the individual points P1, P2, . . . , Pn.

It is possible to describe a variety of feature vectors f for the set of the polygons p1, p2, . . . , pn describing different ones of the sub-sample delays, i.e. different ones of the fraction F of the delay D. The set of the polygons p1, p2, . . . pn may be measured and a feature vector f generated to represent the set of the polygons p1, p2, . . . , pn.

Figure 3E:
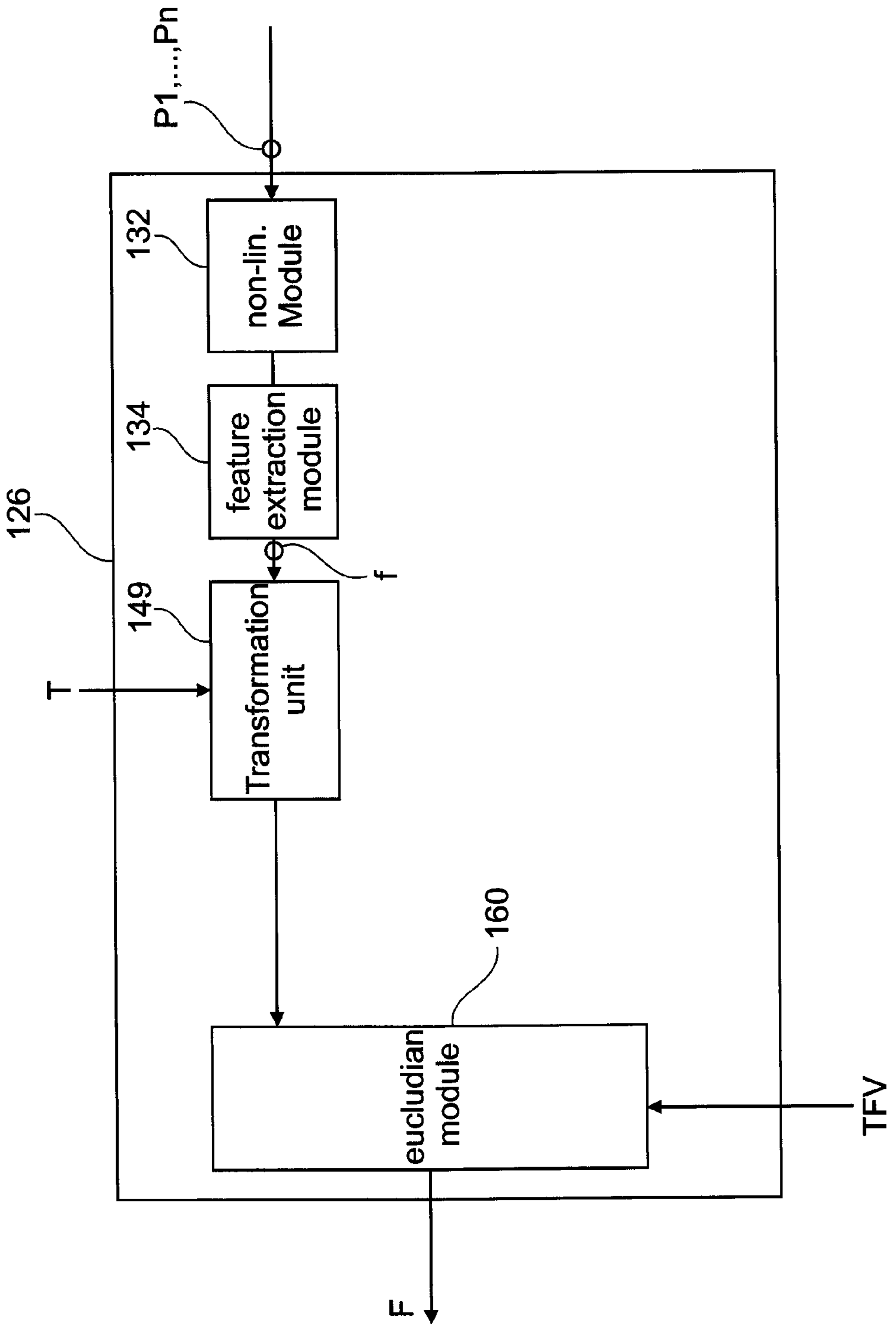
FIG. 3*e* shows an aspect of a pattern classifier.

FIG. 3*e* shows details of the training unit 128. A training set of feature vectors $f_t$ enters the training unit 128 from the right hand side. The training set of feature vectors $f_t$ comprise a plurality of feature vectors associated with to a known fraction F of the delay D. The training set of feature vectors $f_t$ are be actually measured values and/or simulated feature vectors. The training unit 128 is useable independently from the calibration system 10. The training set feature vectors reach a PCA module comprising a covariance module 140. The covariance module 140 generates a covariance matrix M from the training set feature vectors $f_t$. The training unit 128 is typically used during a training period prior to an operation of the calibration system 10. The PCA module further comprises an Eigenvalue module 145. The Eigenvalue module 145 calculates Eigenvectors and Eigenvalues of the covariance matrix M and is not required during runtime of the calibration system 10. The covariance module 140 may without limitation hold a copy of the covariance matrix M determined earlier during a training step, as will be explaining below.

The training set feature vectors $f_t$ are also forwarded to a sorting module 152. The sorting module 152 is adapted to sort the individual ones of the training set feature vectors $f_t$ according to the fraction F of the delay D. Each one of the training set feature vectors $f_t$ is transformed by a projection module 150. The projection module 150 uses a transformation matrix T to provide a transformation or projection of the training set feature vectors $f_t$ from a high-dimensional space (in the above example: 18-dimensional) to a low dimensional sub-space such that principle components of the training set feature vectors $f_t$ are also represented in the lower dimensional sub-space. The dimension of this sub-space is, for example, three. The transformation matrix T may be obtained from the same set of training set feature vectors by applying principle component analysis (PCA). For this purpose a covariance matrix M is calculated from the (training set) feature vectors $f_t$. Calculating the Eigenvectors of the covariance matrix M pertaining to a selected number of largest Eigenvalues, and arranging these Eigenvectors into a matrix then yields a transformation matrix T, which can be used to transform any feature vector into a lower dimensional subspace. Such a transformation or projection of feature vectors is commonly called Karhunan Loève transform in the field of pattern recognition. Feature vectors sorted by the sorting module 152 and transformed by the projection module 150 are forwarded to a template feature vector unit 148. The template feature vector unit 148 provides a set of template feature vectors TFV.

Figure 4A:
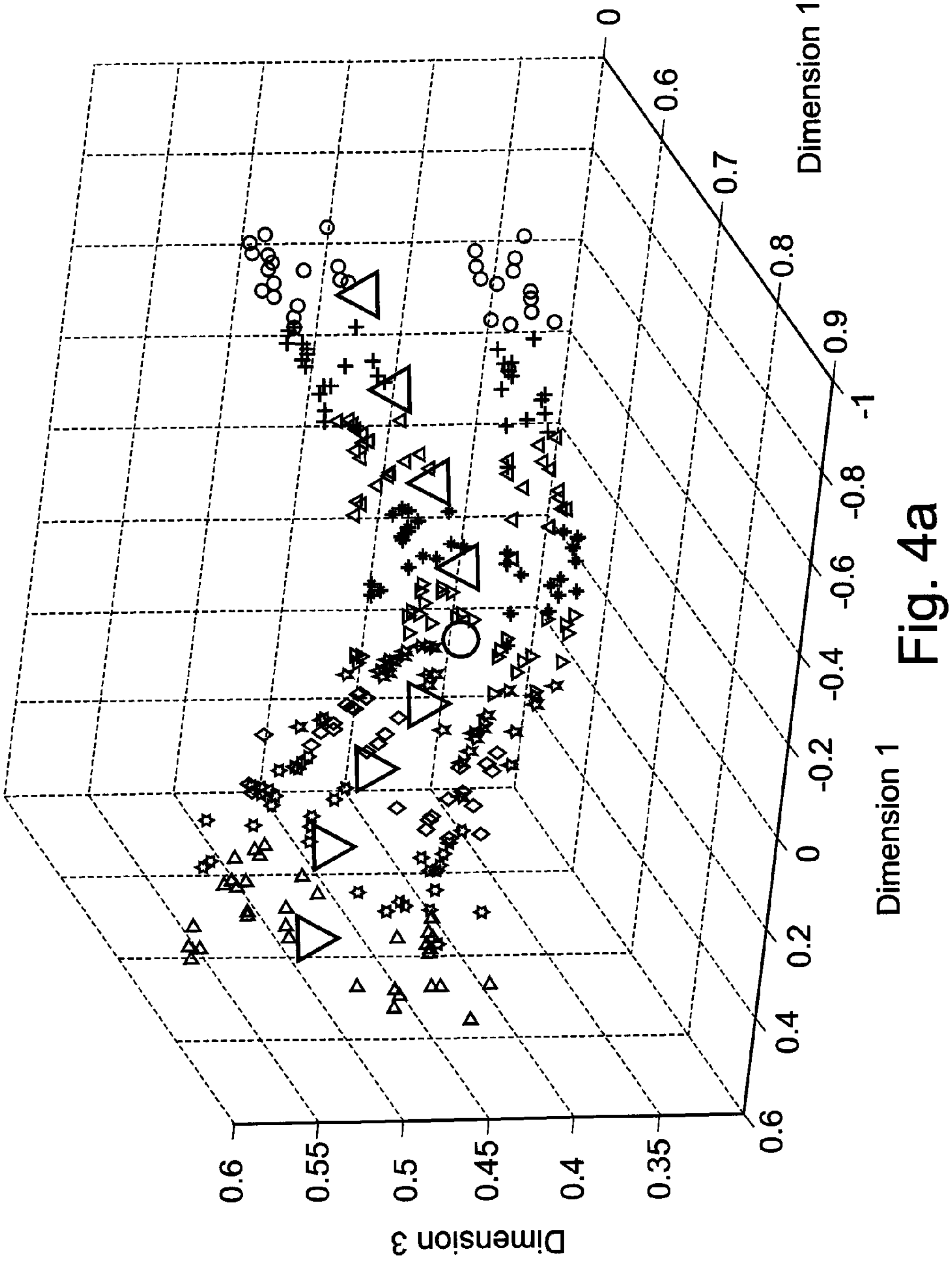
FIG. 4*a* shows a projection of feature vectors.
Figure 4B:
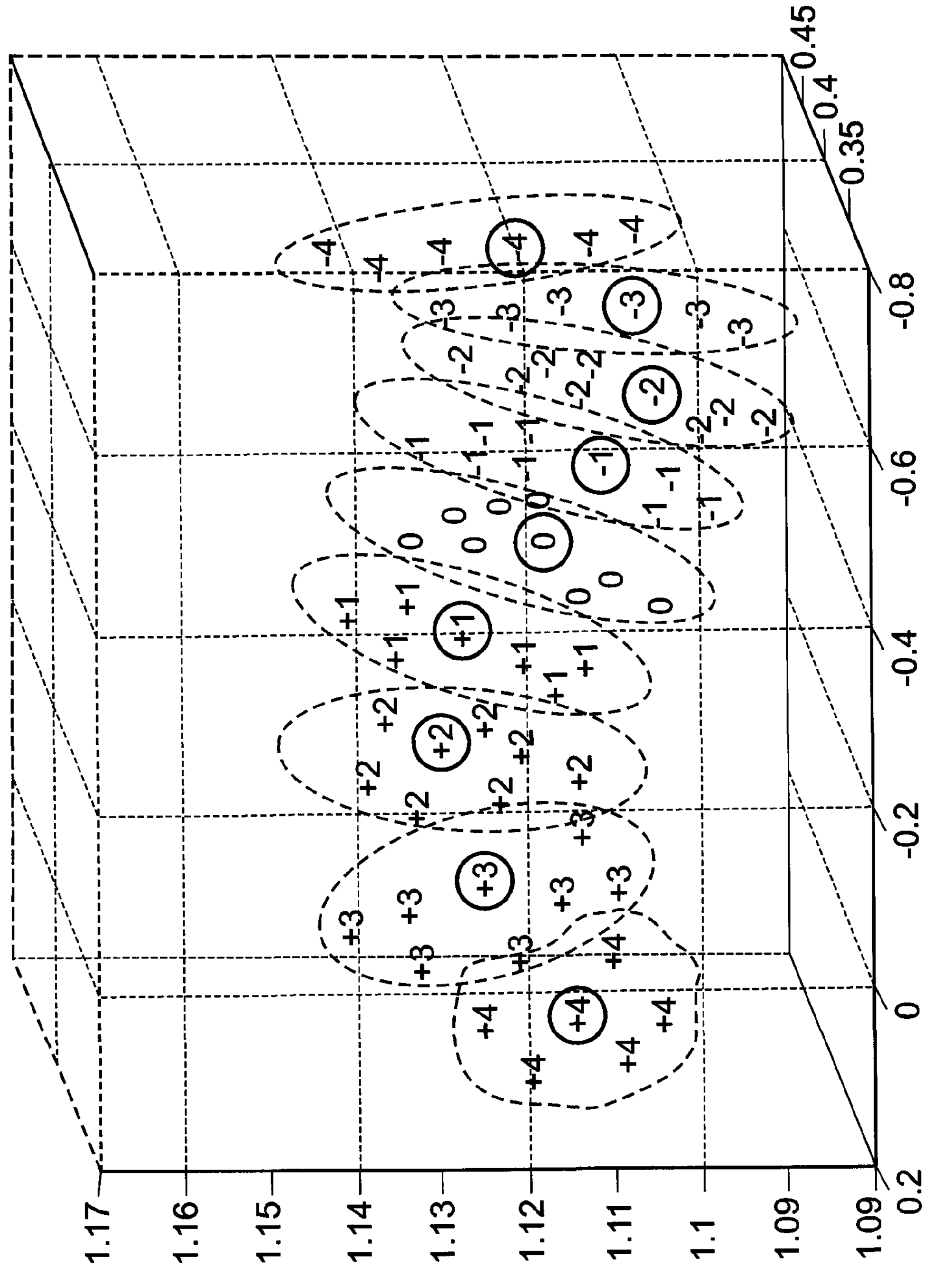
FIG. 4*b* shows a classification according to template feature vectors.

The template feature vectors TFV provide a grouping of feature vectors (measured or calculated) in the lower-dimensional sub-space pertaining to an individual one of the fractions F of the delay D, as depicted in FIG. 4*b*.

It will be noted that the template feature vector 148 may use some sort of averaging over several ones of the training set feature vectors $f_t$ pertaining to a given fraction F in order to form the set of template feature vectors TFV. The averaging may be carried out prior or after the transformation carried out but the projection module 150. The set of template feature vectors TFV and the transformation matrix T are forwarded from the training unit 128 to the pattern classifier 126.

FIG. 3*e* shows the pattern classifier 126. The individual points P1, P2, . . . , Pn in the peak region PR (also referred to as the points P1, P2, . . . , Pn) enter the pattern classifier unit 126 from the right hand side during an operation of the calibration system 10. A non-linear function is applied to the points P1, P2, . . . , Pn by the non-linearity module 132. A feature extraction module 134 extracts an experimental feature vector $f_e$ from the points P1, P2, . . . , Pn. A transformation unit 149 performs a transformation from the 18-dimensional space of the experimental feature vector $f_e$ to the lower-dimensional space, for example three-dimensional space) using the transformation matrix T by left-multiplying the experimental feature vector $f_e$ with the transformation matrix T. The corresponding three-dimensional vector is characteristic for a pattern shape in the peak region PR formed by points P1, P2, . . . , Pn. It is to be understood that the points P1, P2, . . . , Pn entering the pattern classifier 126 are typically generated during the run time of the calibration system 10, whereas the transformation matrix T and/or the set of template feature vectors TFV may have been generated during a training period using the training unit 128.

Projecting the feature vectors $f_e$ onto the sub-space formed by the selected Eigenvectors yields a three dimensional vector. The three dimensional vector represents index values for fractions F, i.e. different ones of the sub-sample shifts. The index values for fractions F may be identified using the set of template feature vectors TFV as discussed above. Let us further assume that the fine sampling rate Rf is eight times faster than the coarse sampling rate Rs. If one wishes to measure the fraction F in steps of the fine sampling time Tf, The set of template feature vectors TFV comprises nine three dimensional vectors, corresponding to the different ones of the fraction F $$(-4, \ldots , 0, \ldots 4)\cdot T_s/8.$$

The polygon classifier 126 as shown in FIG. 3*e* is adapted to indicate the fraction F of the delay D at the fine sampling rate Rf. As mentioned before, the fine sampling rate Rf is an integer multiple of the coarse sampling rate Rs. In terms of coarse sampling time Ts, a fine sampling time Tf is one eighth (Ts/8) of the coarse sampling time Ts corresponding to the coarse sampling rate Rs.

FIG. 4*a* shows vectors corresponding to the different ones of the sub-sample shifts or the different values of the fraction F in steps of the fine sampling time Tf. The triangles pointing downwards represent a negative shift, triangles pointing upwards a positive shift and circles represent no shift. Together, the triangles and the circle represent the set of template feature vector set TFV. FIG. 4*a* represents the projection onto the subspace formed by the Eigenvectors corresponding to the three largest Eigenvalues. For a given one of the (experimental) feature vectors f ($f_e$), it is possible to map this vector to one of the fractions from $$(-4,-3,-2,-1,0,1,2,3,4)/Rs/8,$$

provided the coarse sampling rate Rs is eight times slower than the fine sampling rate Rf.

The cloud of data points in FIG. 4*a* surrounding the triangles and the circle represent the feature vectors f transformed to the three-dimensional sub-space. More precisely the triangles and the circles represent the template feature vectures TFV. The experimental feature vectors $f_e$ correspond to measured polygons p1, p2, . . . , pn in the peak region PR formed by the points P1, P2, . . . , Pn. The scattered points may be classified to one of the possible values of the fraction F represented by the triangles and the circle. The classification of the feature vector f to one of the possible values of the fraction F may be carried out using a distance of the feature vector f from for the possible values of the fraction F using the template feature vectors TFV represented by the triangles and the circle. The feature vector f will be attributed to the least distance from one of the possible values of the fraction F represented by the triangles and the circle. One may use an Euclidean distance (or metric) of the feature vector f from the possible values of the fraction F represented by the triangles and the circle. Without any limitation any other metric may be used; for example a cost-function defining another metric is conceivable. The Euclidian module 160 implements an example of a metric module (see FIG. 3*e*).

FIG. 4*b* illustrates the classification of the feature vectors f to one of the possible values of the fraction F. The classification may yield an overlap between adjacent ones of the fractions F. There are, for example, feature vectors f that may be classified as +4 and as +3 as shown in FIG. 4*b*.

It is possible to use a higher sampling rate Rf for the calibration signal 400. It is costly and not always possible to use the fine sampling rate Rf for the calibration signal 40. Another option to detect the fraction F of the delay D is to correlate an oversampled correlation measurement. Another option is to interpolate a correlation C and to derive the fraction F from the interpolated correlation iC, as will be explained below.

It is to be understood that the calibration system 10 may be used for a system relaying any types of signals, such as but not limited to the transmit signal 90 or a receive signal 55 being sampled at the low sampling rate Rs. It is to be understood that the calibration system 10 is adapted to provide the delay D accumulated along a signal path Sp and a fraction F of the Delay D according to the fine sampling rate. The fraction F is indicative of the accuracy of the delay D as if the delay D was measured at the fine sampling rate Rf.

The aspect of the calibration system 10 is not limited to relaying systems such as the active antenna system 1 discussed so far. One may contemplate measuring delays D through the signal paths SP of, for example, sound systems. If the delay D in the sound system is measured at the coarse sampling rate Rs the present disclosure enables a calculation of the fraction F of the delay D up to an accuracy being an integer multiple higher than the coarse sampling rate Rs at which the pilot signal Pi is being sampled.

Another application of the calibration system 10 of the present disclosure is to use the calibration system 10 in combination with an active antenna system 1. It is to be understood that the calibration system 10 of this disclosure has only been disclosed for an individual one of the signal path SP in the form of a transmit path 70-1, 70-2, . . . , 70-N (see FIG. 7) and/or a receive path 50-1, 50-2, . . . , 50-N (see FIG. 8). The calibration system 10 may be applied to more than one of the signal paths Sp shown in FIGS. 1 and 2.

Figure 5A:
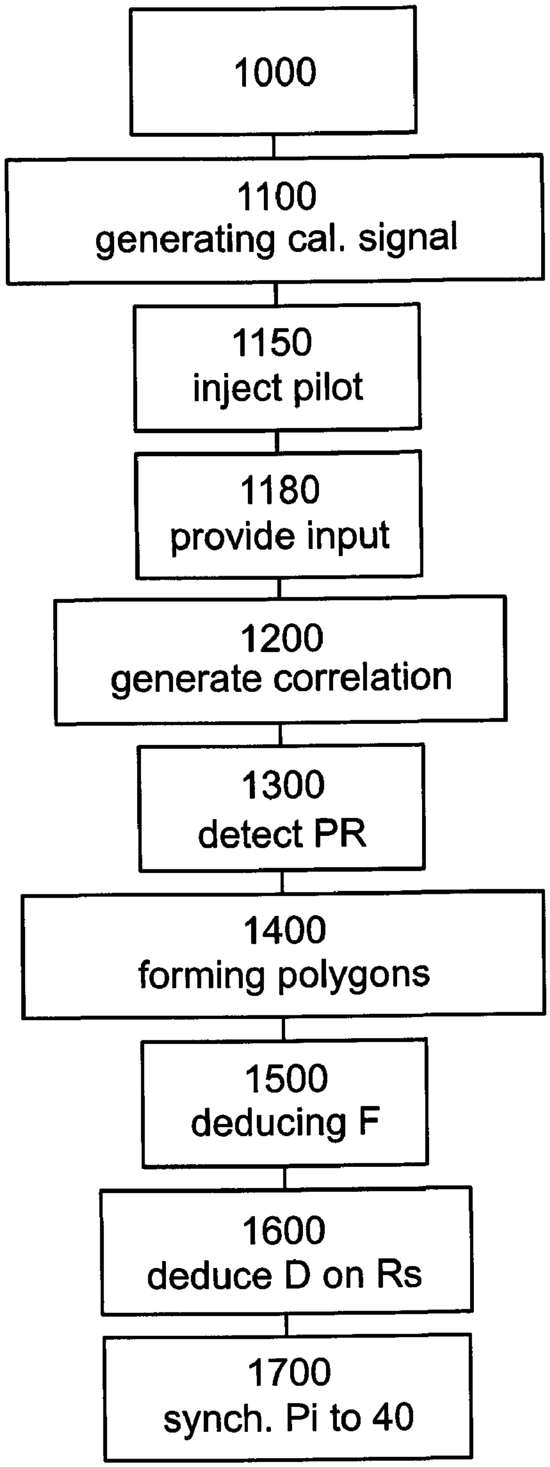
FIG. 5*a* shows a diagram of a method for calibrating.

The present disclosure further provides a method for calibration of the signal paths SP. FIG. 5*a* shows a flow diagram of the method 1000. In a step 1100 the calibration signal 40 is generated. The calibration signal 40 is generated by the calibration signal generator 400. In a step 1150 the pilot signal Pi is injected into a signal upstream of the signal path Sp. The injector 14 (see FIGS. 1 and 2) is used for injecting the pilot signal Pi. In a step 1180 the input signal I is provided by to the correlator 120 as explained with reference to FIGS. 1 and 2.

In a step 1200 the correlation C of the calibration signal 40 and the input signal I is generated. In a step 1300 the peak region PR is detected within the correlation C. In a step 1400 the set of polygons p1, p2, . . . , pn is formed from points P1, P2, . . . , Pn within the peak region PR. In a step 1500 the fraction F of the delay D is deduced from the set of polygons p1, p2, . . . , pn. The fraction F of the delay D indicates an accuracy of the delay D at the fine sampling rate Rf as if the delay was measured at the fine sampling rate Rf. The fine sampling rate is an integer multiple of the coarse sampling rate Rs. A step 1600 comprises a deducing of the delay D on the coarse sampling rate Rs. A step 1700 comprises an optional synchronising of the pilot signal Pi to the calibration signal 40.

Figure 5B:
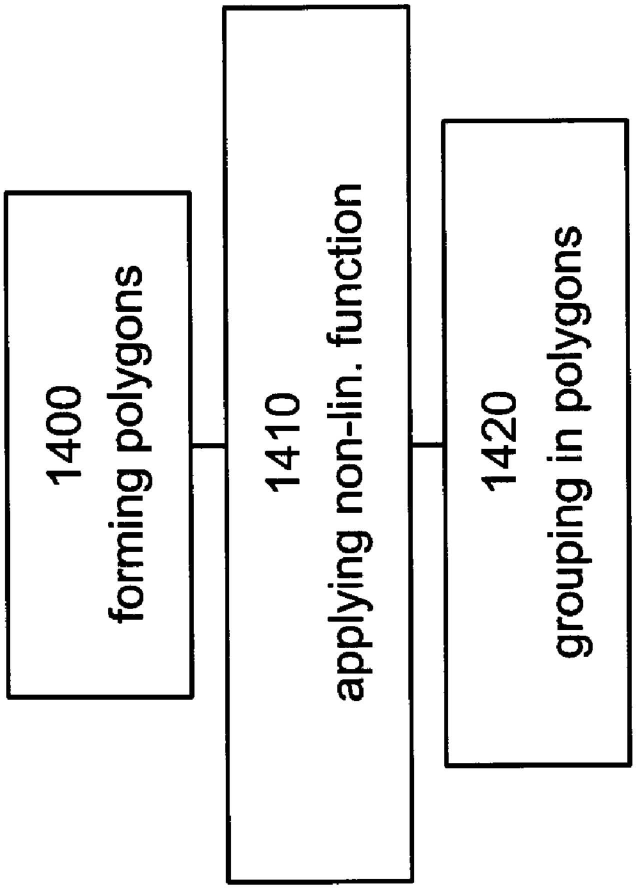
FIG. 5*b* shows details of a step of forming polygons.

FIG. 5*b* shows details of the step 1400 of forming the set of polygons p1, p2, . . . , pn. In a step 1410 a non-linear function is applied to the points P1, P2, . . . , Pn in the peak region PR generating scaled sample points (as was discussed with respect to FIG. 3*b*). In a step 1420 the scaled sample points P1, P2, . . . , Pn are grouped into the set of polygons p1, p2, . . . , pn.

Figure 5C:
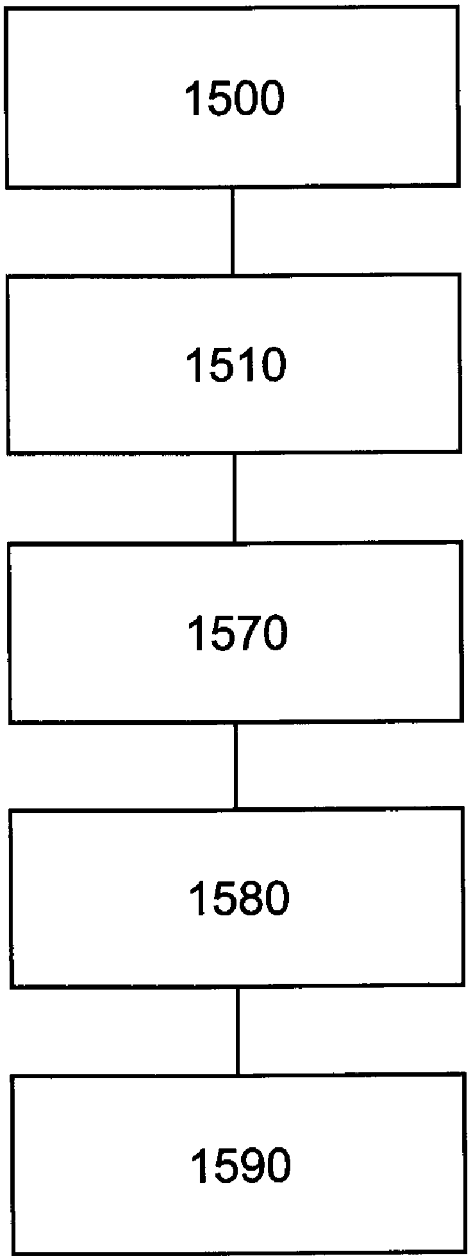
FIG. 5*c* shows further details of the method of calibrating.

FIG. 5*c* shows details of the step 1500 of deducing the fraction F. In a step 1510 a training step is executed. The training step 1510 may be carried out independently from operation of the calibration system 10. It is to be understood that the training step 1510 may be carried out prior to an execution of the remaining steps of the step 1500. A step 1570 comprises a forming of the experimental feature vectors $f_e$. The experimental feature vectors $f_e$ are formed by applying a non-linear function to measured points P1, P2, . . . , Pn as described above. A step 1580 comprises a projection of the experimental feature vectors $f_e$ onto the lower-dimensional sub-space.

In a step 1590 a minimal distance for a selected one of the experimental feature vectors $f_e$ to the template feature vectors TFV is determined after projecting step 1580, as explained with respect to FIG. 4*b*.

Figure 5D:
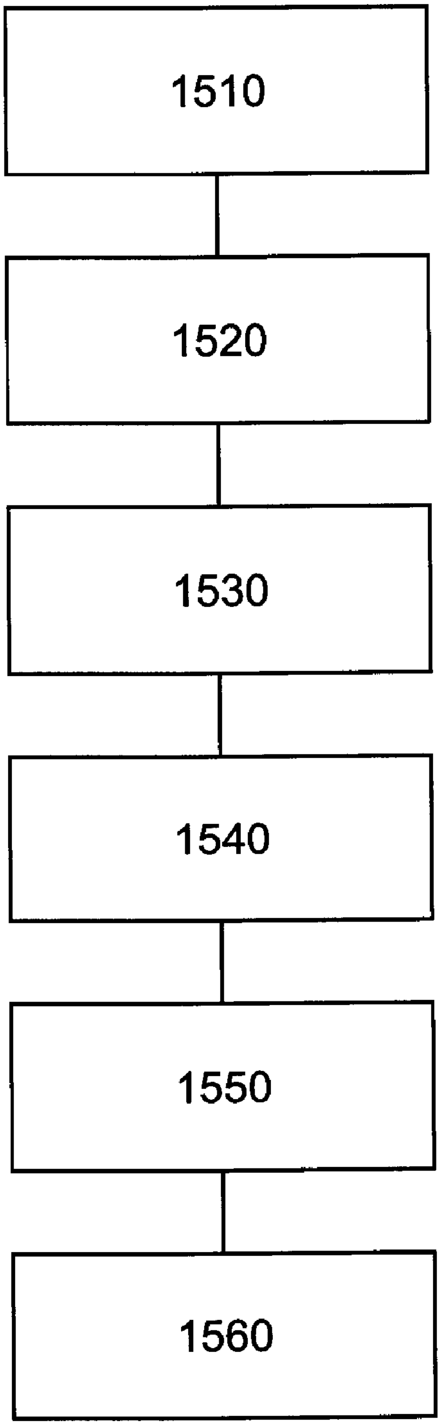
FIG. 5*d* shows details of a training step.

FIG. 5*d* shows details of the training step 1510.

A step 1520 comprises a generating of training feature vectors t. A large number of training feature vectors $f_t$ may be generated in the step 1520.

The step 1530 comprises a calculating of a covariance matrix M of the training feature vectors $f_t$.

In a step 1540 Eigenvectors and Eigenvalues of the covariance matrix M are identified.

In a step 1550 a transformation matrix T is determined. The transformation matrix T provides a transformation from a high-dimensional vector space of the feature vectors $f_t$ on to a lower-dimensional sub-space generated by those Eigenvectors of the covariance matrix M pertaining to the largest Eigenvalues of the covariance matrix M.

In a step 1560 the template feature vectors TFV are generated. The template feature vectors TFV are generated by transforming a group of training feature vectors t using the transformation matrix T on to the lower-dimensional sub-space; as discussed with respect to FIG. 4*b*.

Figure 6:
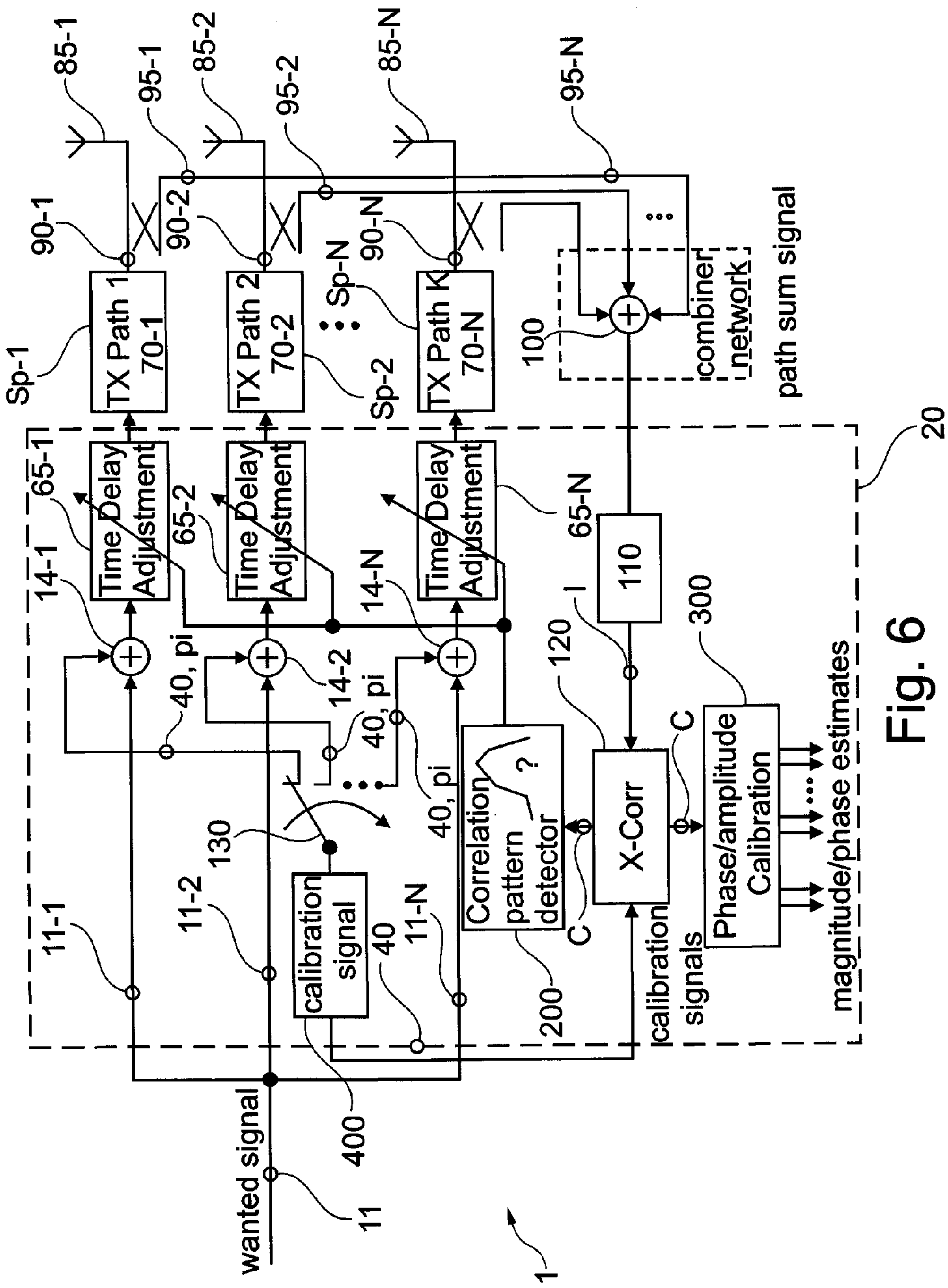
FIG. 6 shows a transmit portion of an active antenna system.

FIG. 6 shows another aspect of the present disclosure in the form of a calibration apparatus 20. The calibration apparatus 20 in FIG. 6 is indicated by a dashed rectangular box enclosing the calibration apparatus 20. The calibration apparatus 20 uses a slightly different setup in order to determine the fraction F of the delay D accumulated along a signal path Sp. As before, the fraction F provides an accuracy of the delay D on a fine sampling rate Rf even if the calibration signal 40 is only sampled at a coarse sampling rate Rs. The fine sampling rate is an integer multiple of the coarse sampling rate. FIG. 6 shows an active antenna system 1, a wanted payload signal 10 is split into several ones of the payload signal 10-1, 10-2, . . . , 10-N. Each of the split payload signals 10-1, 10-2, . . . , 10-N are forwarded to an individual one of transmit paths 70-1, 70-2, . . . , 70-N. The calibration signal generator 400 provides the calibration signal 40. The calibration signal 40 is forwarded to the correlator 120. An input switch 133 is adapted to select an individual one of the transmit paths 70-1, 70-2, . . . , 70-N for insertion of the calibration signal 40. The calibration signal 40 may be inserted as such into individual ones of the transmit paths 70-1, 70-2, . . . , 70-N. Alternatively the calibration signal 40 may be inserted as a pilot signal Pi into the individual ones of the transmit paths 70-1, 70-2, . . . , 70-N. As in the previous embodiment it is to be understood that the calibration signal generator 400 and the correlator 120 both operate in the base band frequency or an intermediate frequency. The base band frequency is substantially lower than the transmit frequency used along the transmit paths 70-1, 70-2, . . . , 70-N. The pilot signal Pi may be attenuated version of the calibration signal 40.

The calibration apparatus 20 further comprises injectors 14-1, 14-2, . . . , 14-N for each one of the transmit paths 70-1, 70-2, . . . , 70-N. The injectors 14-1, 14-2, . . . , 14-N are adapted to inject the calibration signal 40 and/or the pilot signal Pi. A time delay adjustment unit 65-1, 65-2, . . . , 65-N is provided for each one of the transmit paths 70-1, 70-2, . . . , 70-N. The time delay adjustment unit 65-1, 65-2, . . . , 65-N provides an adjustment of the delay D in a high frequency domain. Therefore an adjustment of the delay D is possible to an accuracy of the fraction F with the fraction F being measured at the fine sampling rate Rf being an integer multiple of the coarse sampling rate Rs used for the correlation calculated by the correlator 120 and/or for a sampling of the calibration signal 40 by the calibration signal generator 400.

In FIG. 6 an input signal I to the correlator 120 is provided in the form of coupled transmit signals 95-1, 95-2, . . . , 95-N. The coupled transmit signals 95-1, 95-2, . . . , 95-N are small portions of a transmit signal 90-1, 90-2, . . . , 90-N. The coupled transmit signal 95-1, 95-2, . . . , 95-N are extracted by, for example, directional couplers as is known in the art. The input switch 133 injects the calibration signal 40 into an individual one of the transmit paths 70-1, 70-2, . . . , 70-N. All the coupled transmit signals 95-1, 95-2, . . . , 95-N are combined using a combiner 100 and forwarded as the input signal I to the correlator 120. The input signal I comprises the pilot signal Pi that has traveled along an individual one of the transmit paths 70-1, 70-2, . . . , 70-N. When travelling along the individual one of the transmit paths 70-1, 70-2, . . . , 70-N, the delay D has been accumulated. By a normal correlation of the calibration signal 40 and the input signal I the delay D may be derived as a peak in a correlation pattern CP as is known in the art. The calibration apparatus 20 of the present disclosure further allows the measurement of the fraction F of the delay D. As before the fraction F of the delay D is indicative of an accuracy of the delay D according to the fine sampling rate Rf. Each one of the transmit paths 70-1, 70-2, . . . , 70-N of the active antenna system 1 is terminated by an individual antenna element 85-1, 85-2, . . . , 85-N. The correlation C calculated by the correlator 120 is forwarded to a correlation pattern detector 200 and/or a phase and amplitude calibration module. The phase and amplitude calibration module provide an magnitude and/or phase estimate accumulated along the signal path Sp, being the transmit paths 70-1, 70-2, . . . , 70-N (see FIG. 6) or receive paths 50-1, 50-2, . . . , 50-N. The correlation pattern detector 200 generates an interpolated correlation for a detection of the fraction F of the delay. The interpolation may be achieved using spline shapes or the like.

The calibration apparatus 20 may comprise a down converting unit 110 downstream of the combiner 100. The down converting unit 110 converts the coupled transmit signals 90-1, 90-2, . . . , 90-N from the transmit band into the base band or the intermediate frequency band, as mentioned above.

Figure 7:
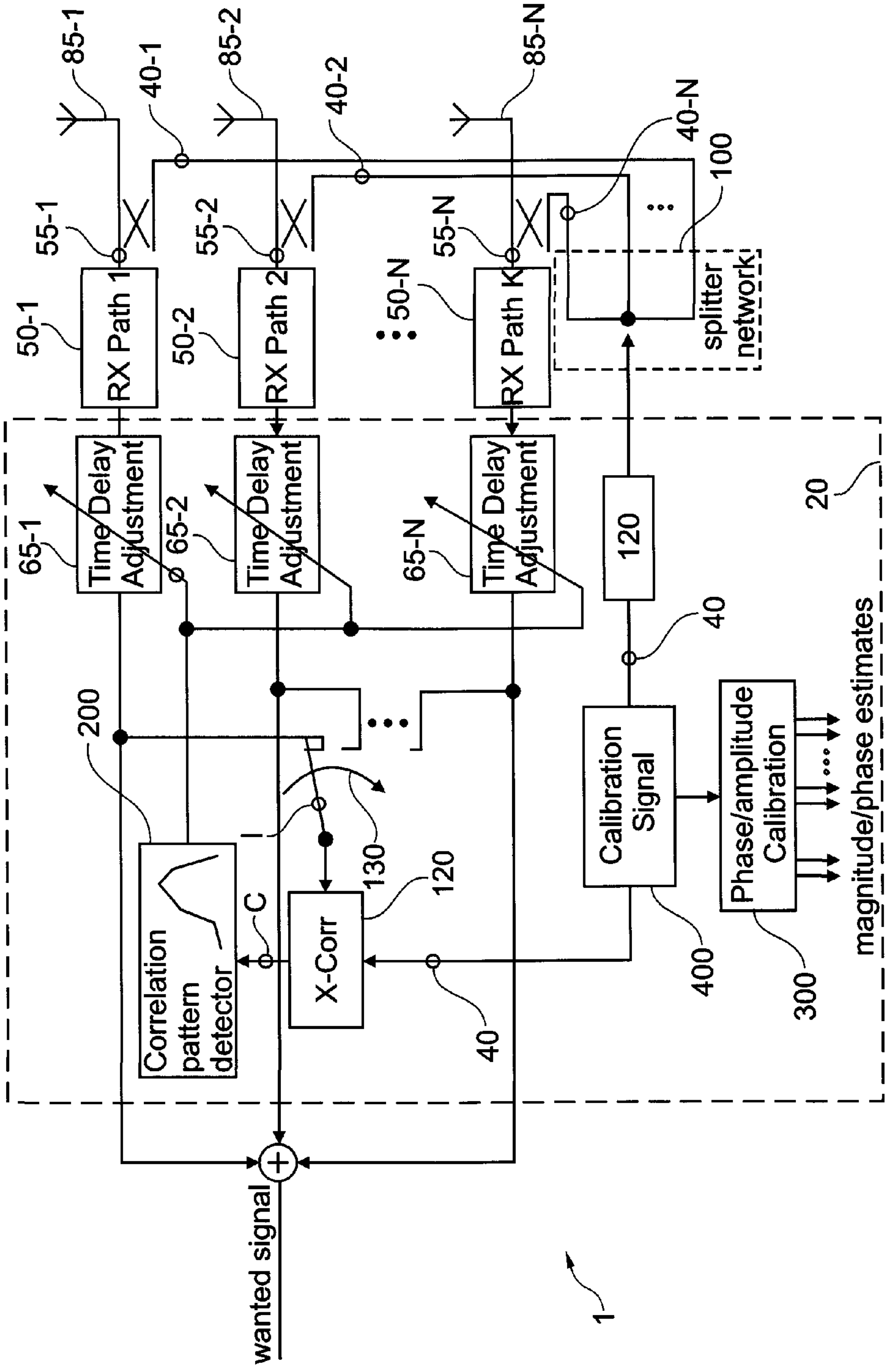
FIG. 7 shows a receive portion of the active antenna system.

FIG. 7 shows the calibration apparatus 20 in combination with a receive portion of the active antenna system 1. Signals received at the antenna elements 85-1, 85-2, . . . , 85-N are forwarded to the receive paths 50-1, 50-2, . . . , 50-N. The calibration signal generator 400 provides the calibration signal 40. The calibration signal 40 may be up converted using the up converting unit 120 and forwarded to reach one of the receive paths 50-1, 50-2, . . . , 50-N using a set of couplers as is known in the art. The calibration apparatus 20 comprises an input switch 133 to select an individual one of receive signals from each one of the receive paths 50-1, 50-2, . . . , 50-N. The signals travelling along the selected one 50-1, 50-2, . . . , 50-N of the receive paths are forwarded as the input signal to the correlator 120. As before, the correlator 120 correlates the calibration signal 40 and the input signal I. The correlator 120 may use an oversampled version of the calibration signal 40 and/or an interpolation of the correlation C calculated by the correlator 120. The input signal I is in the high frequency domain, i.e. it is sampled at the fine sampling rate Rf. The calibration signal 40 is in the base band frequency and in the state of the art sampled to the coarse sampling rate Rs.

A correlation pattern detector 200 may generate an interpolated correlation oC for detecting a fraction F of the delay D. The interpolated correlation oC allows a determination of the subsample shift by a position of a maximum within the interpolated correlation.

The correlation pattern detector 200 may use a set of sample patterns Sc. The sample patterns comprise the correlations C for individual ones of the fraction F of the delay D. The set of sample patterns Sc may be oversampled, i.e. sampled at the fine sampling rate Rf. The correlation pattern detector 200 deduces the fraction F of the delay D sampled at the fine sampling rate Rf in order to add an appropriate compensation to the time delay adjustment unit 65-1, 65-2, . . . , 65-N, such that the delay D accumulated along the signal path Sp, can be compensated for up to an accuracy of the fine sampling rate Rf.

Figure 8:
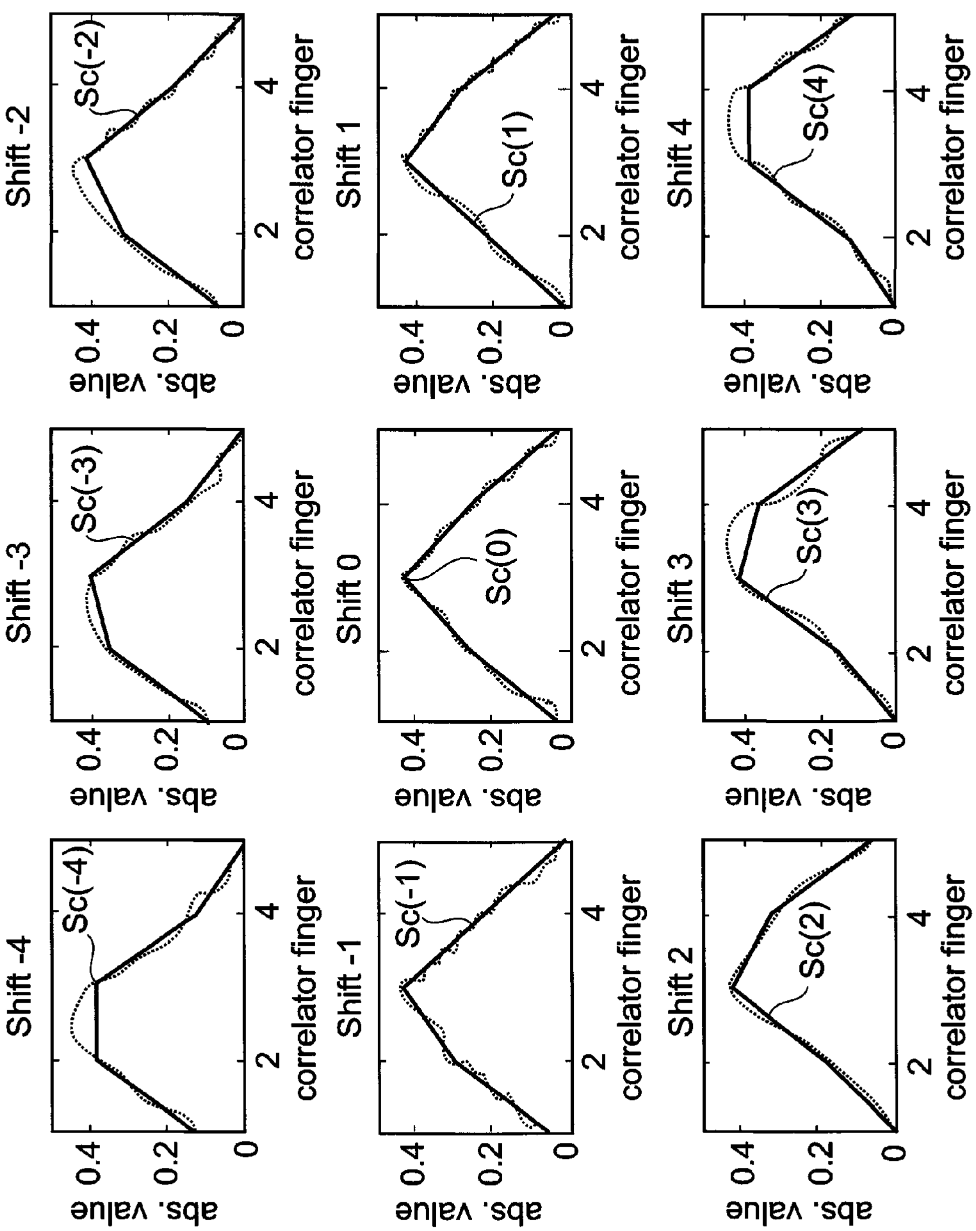
FIG. 8 shows a set of sample patterns Sc.

FIG. 8 shows examples of sample patterns Sc for the correlation C. The sample patterns Sc can be classified according to the sub-sample shift, i.e. according to the fraction F at the fine sampling rate Rf. The examples of FIG. 8 assume that the fine sampling rate Rf is eight times higher than the coarse sampling rate Rs. From the sample patterns Sc the specific one of the fractions F can be distinguished. In the top left drawing Sc(−4) corresponds to a fraction F of minus four sampling steps at the fine sampling rate Rf. The fraction F changes in the drawings from left to right by one sampling step at the fine sampling rate Rf. The very central graph Sc(0) corresponds to a zero shift at the fine sampling rate Rf. The right bottom graph Sc(4) corresponds to a positive shift of four sub-sample steps at the fine sampling rate Rf.

A shape of the sample patterns Sc is indicative of the fraction F of the delay D. The collection of the sample patterns Sc as shown in FIG. 8 is therefore usable for determining the fraction F as if the delay D was measured at the fine sampling rate Rf. In order to "sharpen" the shapes Sc, one may use an interpolated correlation iC indicated by the dotted lines in FIG. 8.

The interpolated correlation iC may be achieved using an interpolation plus an alias filtering such that a peak in the correlation fingers as shown in FIG. 8 is visible more pronouncedly.

Figure 9:
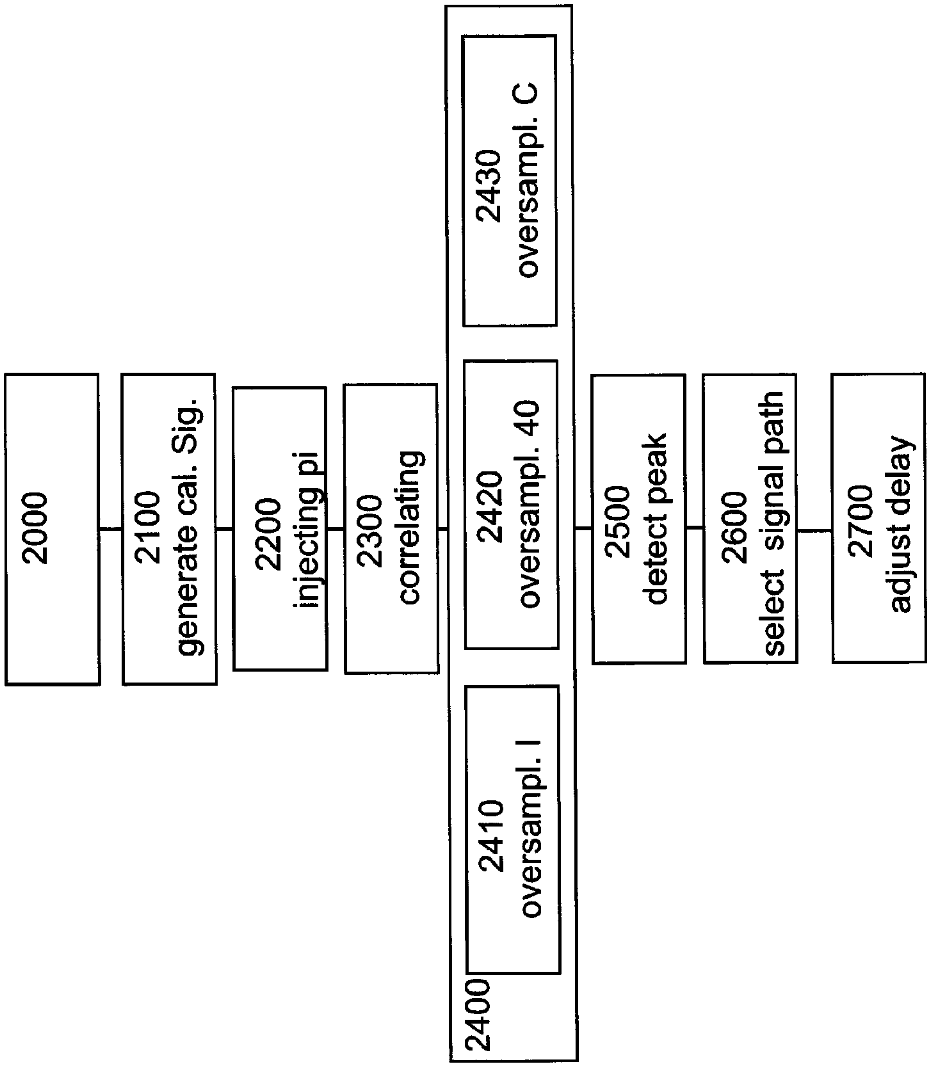
FIG. 9 shows a diagram of a method for delay calibrating.

The present disclosure further teaches a method for a delay calibration 2000. FIG. 9 shows a diagram of the method 2000. In a step 2100, a calibration signal 40 is generated. The calibration signal 40 may be generated by the calibration signal generator 400. Methods for generating the calibration signal 40 are known in the art. In a step 2200 the pilot signal Pi is injected. The pilot signal Pi may be injected upstream of the signal paths Sp-1, Sp-2, . . . , Sp-n. The delay D is accumulated along the signal paths Sp-1, Sp-2, . . . , Sp-N. In a step 2300 the correlation C of an input signal I with the calibration signal 40 is calculated.

An oversampling is carried out in a step 2400. The oversampling may comprise an oversampling of the input signal I in a step 2410, an oversampling of the calibration signal 40 in a step 2420 or an interpolating 2430 of the correlation C or any combination of the steps 2410, 2420 and 2430. The term oversampling shall be construed as sampling the signal at to the fine sampling rate Rf. The step 2430 may be implemented as an interpolating and filtering of the correlation C, yielding the interpolated correlation iC.

In a step 2500, a peak in the interpolated correlation pattern iC is identified. The fraction F of the delay D is deducible from the peak. The fraction F of the delay D is indicative of an accuracy of the delay D as if the delay D was measured at the fine sampling rate Rf. The fine sampling rate Rf is an integer multiple of the coarse sampling rate Rs, as discussed before. The method 2000 was only explained with respect to an individual signal path SP. It is to be understood that the method 2000 may comprise a selecting of a signal path SP. The method further comprises a step 2700 of adjusting the delay D to an accuracy of the fraction F as if the delay D was sampled at the high sampling rate Rf. The adjusting 2700 may be carried out using the time delay adjustment unit 65-1, 65-2, . . . , 65-N. The time delay adjustment unit 65-1, 65-2, . . . , 65-*n* may be implemented as a programmable delay buffer running at a sampling rate of at least Rf. The delay buffer allows delaying a buffer signal by up to n samples. For implementing negative fractions F of the delay D, the buffer signal is advanced by one sample in the base-band sampling domain (sampled at the coarse sampling rate Rs) and afterwards delayed in the high-speed sampling domain by an appropriate number of steps representing the fraction F correctly at the fine sampling rate Rf.

A delay adjustment can also be realized by a programmable symmetric FIR filter comprising a finite impulse response. The programmable symmetric FIR filter is already implemented as an alias-filter for the up-converting (for example in the transmit path 70-1, . . . , 70-N of FIG. 6) of the active antenna system 1. The FIR filter filters a filter signal. An effective length of the programmable symmetric FIR filter can be changed by programming. Symmetric programmable FIR filters of a length m have a constant group delay. The constant group delay is related to the length M and the sampling rate according to $$m/2*Tf.$$

The fraction F can be reduced by effectively shortening the symmetric FIR filter. Hence, an advancing of the filtering signal in time in fractions F according to the fine sampling rate Rf will be performed by shortening the symmetric FIR filter. The time delay may be carried out by delaying the filter signal by one sample in the base-band domain (or the intermediate frequency band) and subsequently shortening the FIR filter by an appropriate number of steps according to the fine sampling rate Rf.

The present disclosure further teaches a computer program product comprising instructions enabling a processor for manufacture of a calibration system 10 according to the present disclosure.

The present disclosure further teaches a computer program product comprising instructions enabling a processor to execute a method 1000 for calibrating.

The present disclosure teaches a computer program product comprising instructions enabling a processor for a manufacture of a calibration apparatus 20 according to the present disclosure.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

| Reference numerals | |
|---|---|
| 1 | active antenna system |
| 10 | calibration system |
| 14 | injector |
| 20 | calibration apparatus |
| 40 | calibration signal |
| 50-1, 50-2, . . . , 50-N | Rx Path |
| 400 | calibration signal generator |
| 55-1, 55-2, . . . , 55-N | receive signal |
| 65-1, 65-2, . . . , 65-N | time delay adjustment unit |
| 70-1, 70-2, . . . , 70-N | transmit path |
| 80-1, 80-2, . . . , 80-N | coupler |
| 85-1, 85-2, . . . , 85-N | antenna element |
| 90-1, 90-2, . . . , 90-N | transmit signal |
| 95-1, 95-2, . . . , 95-N | coupled transmit signal |
| 100 | combiner |
| 110 | down converting unit |
| I | input signal |
| C | correlation |
| Pi | pilot signal |
| Sp | signal path |
| 120 | correlator |
| 122 | detector unit |
| 123 | time estimator |
| 124 | a polygon generator |
| PR | peak region |
| p1, p2, . . . , pn | set of polygons |
| 126 | pattern classifier |
| 132 | non-linearity module |
| 133 | input switch |
| 134 | feature extractor module |
| F | fraction of a delay D |
| D | delay |
| Rf | fine sampling rate |
| Rs | coarse sampling rate |
| 160 | euclidian module |
| P1, P2, . . . , Pn | scaled sample points |
| f | feature vector |
| M | covariance matrix |
| 1000 | method for calibrating |
| 1100 | generating cal. sig. 40 |
| 1150 | injecting pilot signal Pi |
| 1200 | generating a correlation C |
| 1300 | detecting a peak region PR |
| 1400 | forming a set of polygons |
| 1500 | deducing a fraction F |
| 1410 | applying nanlin function |
| 1420 | grouping scaled sample points P1, P2, . . . , Pn |
| 1530 | calculating moments |
| 1540 | forming feature vectors |
| 1560 | determining M |
| 1570 | identifying Eigenvalues eval-1, eval-2, . . . , eval-n and Eigen-vectorsevec-1, evec-2, . . . , evec-n |
| 1580 | projecting feature vectors |
| 1585 | applying projecting to sample PR |
| 1590 | determining least Distance |
| 1600 | deducing the delay D |
| Sc | at least one oversampled sample correlation |
| 2000 | method for delay calibration |
| 2100 | generating cal. sig. |
| 2200 | injecting pilot signal |
| 2300 | generating a correlation C |
| 2400 | oversampling |
| 2410 | oversampling I |
| 2420 | oversampling cal. sig. 40 |
| 2430 | oversampling the correlation C |
| 2500 | identifying correlation pattern |

The invention claimed is:

1. A calibration system comprising:

an injector for injecting a pilot signal upstream of a signal path, the signal path causing a delay at a coarse sampling rate;

a calibration signal generator providing a calibration signal sampled at the coarse sampling rate;

a correlator for calculating a correlation of the calibration signal with an input signal;

a detector unit for detecting a peak region in the correlation;

a polygon generator adapted to form a set of polygons from the peak region;

a pattern classifier unit adapted to calculate a fraction of the delay from the set of polygons;

wherein the fraction of the delay is indicative of an accuracy of the delay at a fine sampling rate, wherein the coarse sampling rate is an integer multiple of the fine sampling rate.

2. The calibration system according to claim 1, wherein the pilot signal is synchronised to the calibration signal.

3. The calibration system according to claim 1, comprising a time estimator adapted to calculate the delay on the coarse sampling rate from the peak region.

4. The calibration system according to claim 1, wherein the peak region comprises N samples at the coarse sampling rate.

5. The calibration system according to claim 1 comprising:

a training unit generating a set of template feature vectors in response to a training set of feature vectors $f_r$; and a transformation matrix formed by selected ones of Eigenvectors of a covariance matrix M of the training set of feature vectors $f_r$.

6. The calibration system according to claim 1, comprising:

a non-linearity module for applying a non-linear function to the peak region of the correlation.

7. The calibration system according to claim 1, comprising a feature extractor module adapted to calculate associated moments of subsets of the set of polygons as a feature vector.

8. The calibration system according to claim 1, comprising a projection module for projecting a matrix onto a subspace of Eigenvectors.

9. The calibration system according to claim 1, comprising an Euclidian module for calculating a least distance of a point to a vector.

10. The calibration system according to claim 1, wherein the signal path is a transmit path.

11. The calibration system according to claim 1, wherein the signal path is a receive path.

12. The calibration system according to claim 1, comprising a time delay adjustment for compensating the delay for the at least one signal path at the fine sampling rate.

13. A method for calibrating a signal path comprising:

generating, by a calibration signal generator, a calibration signal sampled to a coarse sampling rate;

injecting, by an injector, a pilot signal;

generating, by a correlator, a correlation of the calibration signal and an input signal;

detecting, by a detector unit, a peak region in the correlation;

forming, by a polygon generator, a set of polygons from the peak region;

deducing, by a pattern classifier unit, a fraction of a delay from the set of polygons;

wherein the fraction of the delay is indicative for an accuracy of the delay on a fine sampling rate, wherein the fine sampling rate is an integer multiple of the coarse sampling rate.

14. The method according to claim 13, wherein the step of forming the set of polygons comprises:

applying a non-linear function to sample points in the peak region, thereby generating scaled sample points;

grouping the scaled sample points into the set of polygons.

15. The method according to claim 13, wherein the step of deducing the fraction of the delay comprises:

a training in order to generate a set of template feature vectors;

forming an experimental feature vector for the set of polygons.

16. The method according to claim 14, wherein the training comprises:

generating training set feature vectors corresponding to a known fraction of the delay;

calculating a covariance matrix of the training set of feature vectors;

identifying eigenvalues and eigenvectors of the covariance matrix;

calculating a transformation matrix onto a subspace of the eigenvectors corresponding to a set of maximal eigenvalues of the matrix;

generating the set of template feature vectors from the training set feature vectors.

17. The method according to claim 13, further comprising:

projecting, by a projection module, the experimental feature vector using the transformation matrix;

determining, by a Euclidian module, a minimal Euclidian distance for the experimental feature vector from an individual one of the template feature vectors.

18. The method according to claim 13, comprising:

deducing the delay at the coarse sampling rate.

19. The method according to claim 13, comprising:

synchronising the pilot signal to the calibration signal.

20. A calibration apparatus comprising:

at least one injector for injecting a pilot signal upstream of at least one signal path;

a calibration signal generator providing a calibration signal;

a correlator adapted to provide a correlation of the calibration signal with an input signal at a coarse sampling rate;

a correlation pattern detector generating an interpolated correlation for detecting a fraction of the delay, the fraction being indicative of an accuracy of the delay at a fine sampling rate, the fine sampling rate being an integer multiple of the coarse sampling rate.

21. The calibration apparatus according to claim 20, comprising a time estimator adapted to calculate the delay at the coarse sampling rate.

22. The calibration apparatus according to claim 20, wherein the at least one signal path is an at least one transmit path of an active antenna system.

23. The calibration apparatus to claim 20, wherein the at least one signal path is an at least one receive path of the active antenna system.

24. The calibration apparatus according to claim 20 comprising a time delay adjustment unit for compensating the delay for the at least one signal path at the fine sampling rate.

25. The calibration apparatus according to claim 20, wherein the input signal is a coupled transmit signal of the active antenna system.

26. The calibration apparatus according to claim 20, wherein the input signal is a selected one of least one receive signal.

27. The calibration apparatus according to claim 20, comprising an input switch adapted to select the input signal from a plurality of signals.

28. The calibration apparatus according to claim 20, comprising a set of an interpolation unit for generating an interpolated correlation.

29. The calibration apparatus according to claim 20 comprising a phase and amplitude module adapted to extract a deviation from the correlator; the deviation comprising at least one of a phase deviation or an amplitude deviation for at least one of the signal paths.

30. A method for delay calibration comprising:

generating, by a calibration signal generator, a calibration signal;

injecting, by at least one injector, a pilot signal;

generating, by a correlator, a correlation of an input signal with the calibration signal;

oversampling, by a correlator; and identifying, by a correlation pattern detector, a peak in a correlation pattern, wherein a fraction of a delay is deducible from the correlation pattern; wherein the fraction of the delay is indicative of an accuracy of the delay on a fine sampling rate wherein the fine sampling rate is an integer multiple of the coarse sampling rate.

31. The method according to claim 30, the oversampling comprising at least one of:

oversampling the input signal;

oversampling the calibration signal; or interpolating the correlation.

32. A non-transitory computer readable medium containing instructions stored thereon enabling a processor for a manufacture of a calibration system, the calibration system comprising:

an injector for injecting a pilot signal upstream a signal path, the signal path causing a delay at a coarse sampling rate;

a calibration signal generator providing a calibration signal sampled to a coarse time grid;

a correlator adapted to provide a correlation of the calibration signal with an input signal;

detector unit for detecting a peak region in the correlation;

a polygon former unit adapted to form a set of polygons from the peak region;

a pattern classifier unit adapted to deduce a fraction of a delay from the set of polygons;

wherein the fraction of the delay provides an accuracy of the delay at a fine sampling rate, the fine sampling rate being an integer multiple of the coarse sampling rate.

33. A non-transitory computer readable medium containing instructions stored thereon for causing a computer processor to execute a method for calibrating comprising:

generating a calibration signal sampled a coarse sampling rate;

injecting a pilot signal;

generating a correlation of the calibration signal and an input signal;

detecting a peak region in the correlation;

forming a set of polygons from the peak region;

deducing a fraction of a delay from the set of polygons;

wherein the fraction of the delay is indicative of an accuracy of the delay at a fine sampling rate, the fine sampling rate being an integer multiple of the coarse sampling rate.

34. A non-transitory computer readable medium containing instructions stored thereon enabling a processor for a manufacture of a calibration apparatus comprising:

at least one injector for injecting a pilot signal upstream of at least one signal path;

a calibration signal generator providing a calibration signal;

a correlator adapted to provide a correlation of the calibration signal with the input signal at a coarse sampling rate;

a correlation pattern detector generating an oversampled correlation for detecting a fraction of the delay, the fraction being indicative of an accuracy of the delay at a fine sampling rate, the fine sampling rate being an integer multiple of the coarse sampling rate.

35. A non-transitory computer readable medium containing instructions stored thereon for causing a computer processor to perform a method for delay calibration comprising:

generating a calibration signal;

injecting a pilot signal;

generating a correlation of an input signal with the calibration signal;

oversampling; and identifying a correlation pattern, wherein a fraction of a delay is deducible from the correlation pattern; wherein the fraction of the delay provides an accuracy of the delay on a fine sampling rate wherein the fine sampling rate is an integer multiple of the coarse sampling rate.

* * * * *

UNITED STATES PATENT AND TRADEMARK OFFICE

CERTIFICATE OF CORRECTION

PATENT NO. : 8,374,826 B2
APPLICATION NO. : 12/709572
DATED : February 12, 2013
INVENTOR(S) : Schmidt et al.

It is certified that error appears in the above-identified patent and that said Letters Patent is hereby corrected as shown below:

In the Specifications:

Column 12, line 51, “t” should read -- $f_t$ --;

Column 12, line 65, “t” should read -- $f_t$ --;

In the Claims:

Column 19, Claim 23, line 1, “The calibration apparatus to claim 20,” should read -- The calibration apparatus according to claim 20, --;

Signed and Sealed this
Fourteenth Day of May, 2013

Teresa Stanek Rea
*Acting Director of the United States Patent and Trademark Office*

UNITED STATES PATENT AND TRADEMARK OFFICE

CERTIFICATE OF CORRECTION

PATENT NO. : 8,374,826 B2
APPLICATION NO. : 12/709572
DATED : February 12, 2013
INVENTOR(S) : Schmidt et al.

It is certified that error appears in the above-identified patent and that said Letters Patent is hereby corrected as shown below:

In the Specifications:

Column 12, line 51, "t" should read -- $f_t$ --;

Column 12, line 65, "t" should read -- $f_t$ --;

In the Claims:

Column 19, line 48 (Claim 23, line 1) "The calibration apparatus to claim 20,"
should read -- The calibration apparatus according to claim 20, --;

This certificate supersedes the Certificate of Correction issued May 14, 2013.

Signed and Sealed this
Eleventh Day of June, 2013

Teresa Stanek Rea
*Acting Director of the United States Patent and Trademark Office*